(12) United States Patent
Haid et al.

(10) Patent No.: US 9,154,639 B2
(45) Date of Patent: Oct. 6, 2015

(54) RULE-BASED MOBILE DIALING BASED ON A CHANGE OF EVENT

(71) Applicant: MobileDay, Inc., Boulder, CO (US)

(72) Inventors: James Haid, Boulder, CO (US); Dustin Mallory, Erie, CO (US); Jason Anderson, Boulder, CO (US)

(73) Assignee: MobileDay, Inc., Boulder, CO (US)

( * ) Notice: Subject to any disclaimer, the term of this patent is extended or adjusted under 35 U.S.C. 154(b) by 0 days.

(21) Appl. No.: 14/614,260

(22) Filed: Feb. 4, 2015

(65) Prior Publication Data

US 2015/0222758 A1    Aug. 6, 2015

Related U.S. Application Data

(60) Provisional application No. 61/935,459, filed on Feb. 4, 2014.

(51) Int. Cl.
| | |
|---|---|
| H04M 3/42 | (2006.01) |
| H04M 15/34 | (2006.01) |
| H04M 15/36 | (2006.01) |
| H04M 15/00 | (2006.01) |
| H04W 4/26 | (2009.01) |

(52) U.S. Cl.
CPC .............. *H04M 15/34* (2013.01); *H04M 15/36* (2013.01); *H04M 15/49* (2013.01); *H04W 4/26* (2013.01)

(58) Field of Classification Search
None
See application file for complete search history.

(56) References Cited

U.S. PATENT DOCUMENTS

| | | | | |
|---|---|---|---|---|
| 6,873,846 | B1 * | 3/2005 | Gerber et al. | 455/440 |
| 8,548,143 | B2 * | 10/2013 | Vendrow | 379/201.01 |
| 2003/0216960 | A1 * | 11/2003 | Postrel | 705/14 |
| 2006/0072726 | A1 * | 4/2006 | Klein et al. | 379/201.01 |
| 2006/0077943 | A1 * | 4/2006 | Liu et al. | 370/338 |
| 2008/0075261 | A1 * | 3/2008 | Ramanathan et al. | 379/220.01 |
| 2008/0248822 | A1 * | 10/2008 | Jarvinen et al. | 455/509 |
| 2009/0028318 | A1 * | 1/2009 | Bhogal et al. | 379/211.02 |
| 2010/0130213 | A1 * | 5/2010 | Vendrow et al. | 455/445 |

* cited by examiner

*Primary Examiner* — Keith Fang
(74) *Attorney, Agent, or Firm* — Holland & Hart LLP

(57) ABSTRACT

Methods, systems, and devices are described that provide for directing a voice or video call using least cost dialing. Rules for directing a call may be generated by a server or a mobile device. The rules may be applied at a mobile device, facilitating a least-cost call with little or no input from the user of the mobile device. The rules may be based on identifying information about a caller or an intended call, or both. In determining what constitutes a least-cost option, a number of resources and factors, both monetary and non-monetary, may be considered. In some examples, a call identifier may be sent from a mobile device to a server, and the mobile device may receive, in response, one or more rules for directing a call. The rules may be applied at the mobile device, and the call may be placed accordingly.

7 Claims, 16 Drawing Sheets

700-b

| Known ID | Network Service Provider | Location | Callee Number |
|---|---|---|---|
| ⋮ | ⋮ | ⋮ | ⋮ |
| xy72L | Provider X | Denver CO Metro | 720-123-4567 |
| xy72L | Not Provider X | USA, Not Denver Metro | 800-123-4567 |
| xy72L | Not Provider X | Not USA | 00-1-720-123-4567 |
| ⋮ | ⋮ | ⋮ | ⋮ |

780 / 782 / 784 / 786

FIG. 7B

RULE-BASED MOBILE DIALING BASED ON A CHANGE OF EVENT

CROSS REFERENCES

The present application for patent claims priority to U.S. Provisional Patent Application No. 61/935,459 by Haid et al., entitled "Least Cost Dialing," filed Feb. 4, 2014, which is assigned to the assignee hereof, and expressly incorporated by reference herein.

BACKGROUND

A business or enterprise may have a variety of telephone numbers from which employees, clients, and/or customers may choose for placing a call. It is common for businesses with multiple locations to have various options for intra-company calls, which may be less expensive than calls routed via the public switched telephone network (PSTN). In some cases, a particular enterprise may have several numbers available for conference calls, and the various numbers may have different cost implications (e.g., depending on the participants, or the location of the participants).

Whenever multiple options (e.g., multiple telephone numbers) are available for placing a phone call, some economic benefit may be realized by selecting a particular option. However, the onus of selecting a least cost option typically falls on the person placing the call, and that person may have little incentive to make an informed choice; or the economic benefits of a certain calling option may be unknown. It may therefore be beneficial to employ mechanisms for least cost dialing that require little or no input from a caller.

SUMMARY

Described below are methods, systems, and apparatuses that provide for least cost dialing. Rules for directing a voice or video call may be sent from a server to, or generated by, and applied at a mobile device with little or no input from the user of the mobile device. The rules may be based on identifying information about a caller or an intended call, or both. In some cases, the rules are generated in an effort to allow a call to be placed such that an enterprise or organization is exposed to the lowest cost for the call. In other examples, the rules may be based on additional or alternative factors, including reliability and security.

A method of wireless communication with a mobile device is described. The method may include sending a call identifier from the mobile device to a server via a wireless network, receiving at the mobile device from the server one or more rules for directing a call, the rules based at least in part on the call identifier, determining a geographic location of the mobile device, applying one or more of the received rules at the mobile device based at least in part on the determined geographic location, and placing a call based at least in part on the applied rules.

An apparatus, which may be a mobile device, is also described. The mobile device may include a processor, memory in electronic communication with the processor, and instructions stored in the memory. The instructions may be operable, when executed by the processor, to cause the mobile device to send a call identifier from the mobile device to a server via a wireless network, receive at the mobile device from the server one or more rules for directing a call, the rules based at least in part on the call identifier, determine a geographic location of the mobile device, apply one or more of the received rules at the mobile device based at least in part on the determined geographic location, and place a call based at least in part on the applied rules.

A further apparatus, which may be a mobile device, is also described. The apparatus may include a transmitter module to send a call identifier from the apparatus to a server via a wireless network, a receiver module to receive from a server one or more rules for directing a call, the rules based at least in part on the call identifier, a location module to determine a geographic location of the apparatus, and a rule application module to apply one or more received rules based at least in part on a determined geographic location of the apparatus.

The methods, systems, and apparatuses described herein may also include features, means, modules, process, or instructions for determining a service provider associated with the wireless network, and applying the one or more received rules at the mobile device is based at least in part on the determined service provider. Additionally or alternatively, the may include features, means, modules, process, or instructions for determining a capability of the mobile device for initiating a call type, and applying the one or more received rules at the mobile device is based at least in part on the determined capability. In some examples, the call type may be at least one of a voice call, a video call, or a video telephony call.

The methods, systems, and apparatus described herein may also include features, means, modules, process, or instructions for identifying a significant change event for the mobile device, and identifying a call identifier based at least in part on the significant change event. The significant change event may include at least one of entering or leaving the wireless network, performing a cellular mobility operation, receiving a software update, or powering on or off.

In some examples, the one or more rules for directing the call are received via the wireless network, and placing the call comprises utilizing a different wireless network for placing the call. The wireless network may be a wireless local area network (WLAN) and the second network may be a licensed spectrum cellular network. The call identifier may include a telephone number or a user identification number, or both. In some examples, the call identifier is indicative of a first telephone number, and the rules include directions for the mobile device to place a call to a second telephone number different from the first telephone number and selected according to the location of the mobile device.

A further method is also described. The method may include receiving a call identifier from a mobile device via a wireless network, generating one or more rules for directing calls based at least in part on the call identifier, where the one or more rules include directions applicable to the mobile device based at least in part on a location of the mobile device, and sending the generated rules to the mobile device via the wireless network.

A further apparatus is also described. The apparatus may include a processor, memory in electronic communication with the processor, and instructions stored in the memory and operable, when executed by the processor, to cause the apparatus to receive a call identifier from a mobile device via a wireless network, generate one or more rules for directing calls based at least in part on the call identifier, where the one or more rules include directions applicable to the mobile device based at least in part on a location of the mobile device, and send the generated rules to the mobile device via the wireless network.

The methods, systems, and apparatus described herein may also include features, means, modules, process, or instructions for identifying relevant data for a call. The relevant data may include at least one of: the location of the mobile device, a location of a callee associated with the call identifier, network availability associated with the mobile device or call identifier, available technology for a call from the mobile device, or a combination thereof, and generating the one or more rules for directing the call may be based at least in part on the identified relevant data.

In some examples, the one or more rules include directions applicable to the mobile device based at least in part on a service provider of the wireless network or a capability of the mobile device for initiating a call type. In some examples, the call identifier is indicative of a first telephone number, and the one or more rules may include directions for the mobile device to place the call to a second telephone number different from the first telephone number and selected according to the location of the mobile device. Additionally or alternatively, the one or more rules may include directions for the mobile device to utilize a second network for placing a call.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 7B illustrates call-related data that may be utilized for LCD according to the present disclosure.

DETAILED DESCRIPTION

A mobile phone user, for example, may initiate a phone call, and, with little or no additional input from the user, the call may be directed in manner that utilizes the lowest cost option for connecting the call. A number of rules for directing or connecting a call may be established based on several variables associated with the call: availability of different telephone numbers, caller location, intended-recipient location, time-of-day, quality-of-service requirements, network availability, internet connectivity, and the like. These calling rules may be based on information supplied by a mobile device and applied prior to connecting a call. In some cases, the rules are based on a call identifier provided by a mobile device initiating a call, and they are applied at or by the call-initiating mobile device.

Figure 1:
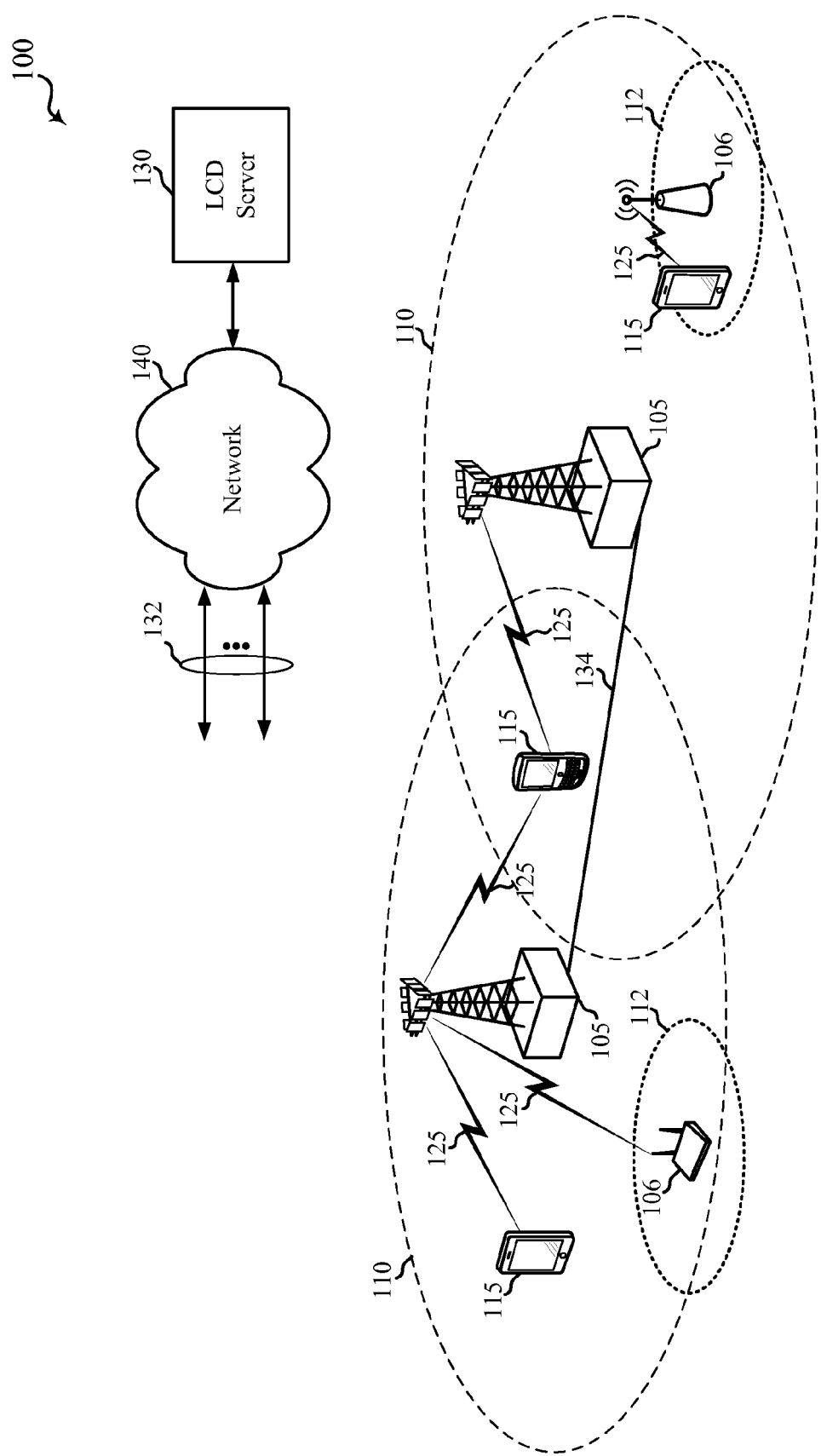
FIG. 1 illustrates an example of a wireless communications system that supports least cost dialing (LCD) in accordance with the present disclosure.

Referring first to FIG. 1, a block diagram illustrates an example of a wireless communications system that support least cost dialing (LCD). The system 100 includes subsystems and devices capable of communicating with one or a number of technologies, including GSM, CDMA (e.g., CDMA2000, UTRA, etc.), LTE/LTE-A, IEEE 802.11 (Wi-Fi), IEEE 802.16 (WiMAX), IEEE 802.20, Flash-OFDM, and the like.

The system 100 includes base stations (or cells) 105, wireless access points (APs) 106, mobile devices 115, and an LCD server 130. The base stations may provide coverage to mobile devices 115 within a respective coverage area 110, while the APs 106 may provide coverage for a respective coverage area 112. The base stations 105 may communicate, via communication links 125, with the mobile devices 115 under the control of base station controller (not shown); and the APs 106, which may likewise communicate with mobile device 115 via communication links 125, may be aspects of a wireless local area network (WLAN). Both the base station controller(s) and the WLAN may be aspects of the network 140. The network 140 may include both circuit-switched and packet-switched subsystems, and it may include the PSTN, public land mobile networks (PLMNs), private branch exchanges (PBXs), wide area networks (WANs), and the like. In some examples, the base stations 105 and APs 106 communicate with the network 140 via backhaul links 132, which may be wired (e.g., copper, fiber, or the like) or wireless, or both. The base stations 105 may also communicate with one another over backhaul links 134. A mobile device 115 may be a cordless phone, a cellular phone, a smartphone, a personal digital assistant, a tablet computer, a laptop computer, a wireless local loop (WLL) station, or the like.

A mobile device 115 may generate and send a call identifier ("call ID") to the LCD Server 130 and, in response, the mobile device 115 may receive one or more rules to apply when placing subsequent calls. The mobile device 115 may send a call ID and receive rules well in advance of placing the call. For example, a mobile device 115 may be updated at certain intervals with rules to apply until additional or revised rules are received.

Additionally or alternatively, a mobile device 115 may generate a call ID when a user attempts to place a phone call. For example, before dialing a phone number, a mobile device 115 may send a call ID indicative of the intended number, and it may receive an alternative number to use in placing the call.

The call ID may be a function of the call type the user seeks to make. For instance, in a conference call application, the call ID may include the conference dial-in number and/or a conference access code. But for other scenarios, the call ID may simply include information about the caller and the intended recipient (callee)—e.g., the call ID may include employee identification numbers specific to caller and callee, respectively. The call ID may be routed to a server, like the LCD server 130. If, for example, the caller is connected to her enterprise's WLAN, the call ID may be routed via the enterprise's network to a WAN backhaul link 132, to the network 140, and to a remote LCD server 130. Or, if a caller is connected to base station 105, the call ID may be routed to the LCD server 130 via the network 140 through a backhaul link 132, which may be an Si interface. In any event, upon receiving the call ID, the LCD server 130 may generate one or several rules for directing the intended call.

In some examples, the rules may be based a geographic location of mobile device 115. Mobile device 115 may determine its location (e.g., via GPS, multilateration calculations, signal strength calculations, etc.). The LCD server 130 may or may not be aware of the present location of mobile device 115, but may generate rules, as described below, with directions to apply the rules according to the mobile device's 115 location. That is, certain rules may be based on a location of the mobile device 115, as described below. In some examples, the presence of the mobile device 115 within a particular network—e.g., a particular WLAN or cellular network—may be utilized to determine the location of the mobile device. For instance, the mobile device's presence within a network may represent the location of the mobile device.

The rules may be generated with the goal of connecting the caller and callee using the least-expensive means available. For example, rules may be generated in an effort to reduce the expense or costs to the enterprise or organization responsible for paying for the caller's calls. Cost may include the amount of money, time, energy, manpower, and/or other resources necessary for a caller to place an intended call (or for an enterprise to facilitate a particular call). Additionally or alternatively, cost may be a function of reliability and or security of an intended call. The LCD rules may include some weighted valuation of price, reliability, or security of various options for a particular call. In some cases, certain factors may be more important than others. For instance, depending on the type of information intended to be exchanged in the call, a secure connection may be more important than the monetary cost of a placing the call. In other words, the rules for a call or calls may direct a mobile device 115 to connect the callee in a manner that is more expensive (e.g., costs more money) than other alternatives, but which is less vulnerable to security threats (e.g., stolen information). Thus, a least-cost option may be defined in different ways for different enterprises, and it may include various economic considerations beyond monetary expenditures.

For example, the LCD server 130 may determine that if the caller and callee are each connected to a common enterprise network (e.g., WLAN, PBX, etc.) an intra-network call may represent a least-cost dialing option because there are relatively little monetary costs or security risks associated. The reliability of such a call may also be a determining factor. In other cases, a call routed via the PSTN may offer a least-cost option because, for example, it requires the lowest monetary outlay. In a conference scenario, the LCD server 130 may select, from a list of available numbers, the least expensive (e.g., lowest price, highest security, highest reliability, etc.) option—e.g., if a dedicated toll-free number is available, the LCD rules may include a preference for that number.

Depending on the call ID, the rules may be based on time-of-day, location of caller, location of callee, network connectivity of caller and callee, and the like. In some examples, the LCD server generates the LCD rules by, in part, comparing the call ID to a database of known IDs. Once generated, the LCD rules may be transmitted to the mobile device 115, where they are applied (e.g., by an application at the device) and the call is placed. If an LCD server 130 is configured with enterprise-specific rules, it may include certain LCD rules for employees (e.g., employees seeking to access a conference bridge) and it may include other rules for non-employees. But in some instances, an LCD server 130 generates rules based on the location of callers without regard to their status as employees of a particular enterprise.

In some examples, rules may be based on a service provider (e.g., a cellular carrier) associated with a network utilized by a mobile device 115. A mobile device 115 may, for example, recognize whether it is connected to is home PLMN, visitor PLMN, or the like, and it may apply rules accordingly. Additionally or alternatively, a mobile device may determine its capability for making a particular call type—e.g., a voice call, a video call, a video telephony call—and may apply rules accordingly. For instance, a capability of a mobile device 115 to make a particular call may be based on a user preference, a power state (e.g., current battery power), strength or quality of a network connection, time-of-day, location, or the like.

Figure 2:
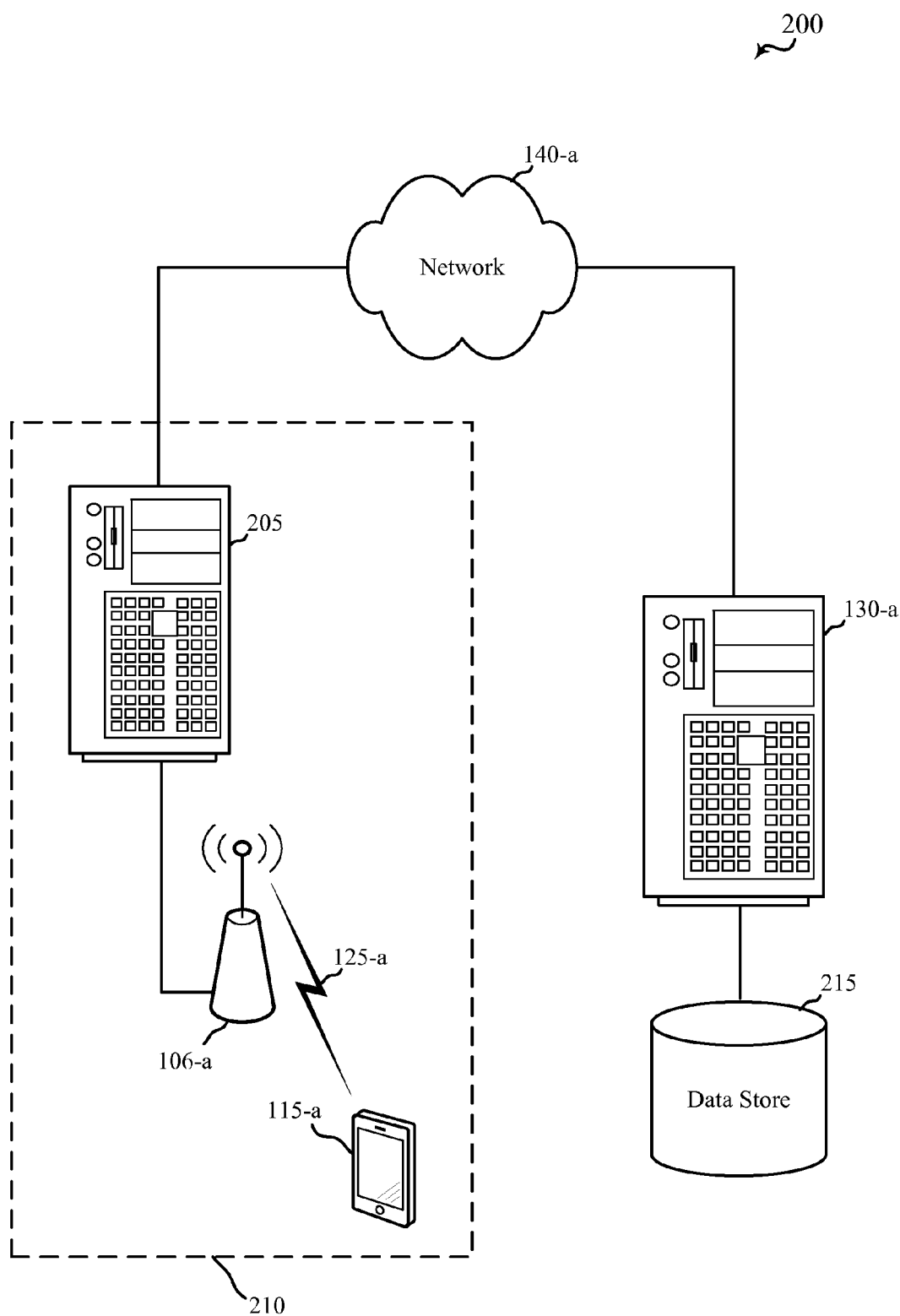
FIG. 2 illustrates an example of a wireless communications system that supports LCD in accordance with the present disclosure.

Turning now to FIG. 2, a block diagram depicts an example of a communications system 200 that supports LCD. The system 200 may be an example of aspects of the system 100. The system 200 may include an AP 106-a, which may be in communication with a mobile device 115-a via communication link 125-a. In some examples, however, a system 200 may implement LCD via a landline or a wide area network (e.g., a wireless WAN) without the necessity of an AP 106. So, while the system 200 is described with reference to a WLAN connection, various connections to an LCD server 130 may also be employed. In other cases, a mobile device 115 connects to an LCD server 130 via a base station 105 and a cellular service provider's network, without any connection to a WLAN, WWAN, or landline.

The system 200 may include an LCD server 130-a and network 140-a. Each of these may be examples of corresponding elements of FIG. 1. The system 200 may also include an enterprise server 205 located within a demarcated area 210 (e.g., a corporate facility). In some examples, the LCD server 130-a is configured with one or several data stores 215, which may be remote from the LCD server 130-a.

The mobile device 115-a may be configured for LCD. A user of the mobile device 115-a, who may be an employee of the enterprise located within the demarcated area 210, may seek to place a call. In some cases, the mobile device 115-a generates a call ID based on information input by the user or available on the mobile device 115-a. The call ID is then sent via AP 106-a, and the network 140-a, to the LCD server 130-a. The LCD server 130-a generates rules for directing the call (e.g., LCD rules) based, in part, on the call ID. In some examples, the LCD server 130-a determines LCD rules by comparing the call ID to one or more databases, which may be located on the LCD server 130-a or the data store 215. The LCD server 130-a may transmit the rules to the mobile device 115-a, which may apply some or all of the rules when placing a call.

In some cases, the call ID includes a single telephone number that a caller intends to dial. In such cases, the responsive LCD rules may include a different number that the mobile device 115-a should use for the call when a particular situation exists. For example, a particular conference call may be accessed by two numbers: a local number and a toll-free number. In anticipation of the conference call, the mobile device 115-a may send, as the call ID, the local conference call number. The LCD server 130-a may, by reference to a database of conference call numbers, recognize that a toll-free dial-in is available. The LCD server 130-a may thus generate rules that instruct the mobile device 115-a to use the toll-free number to access the conference if the mobile device 115-a is outside the local calling area at the time of the conference call.

The temporal relationship between sending the call ID and applying rules at the mobile device 115-*a* may vary with different scenarios. In some examples, a mobile device 115-*a* sends a call ID upon connecting to the AP 106-*a*. For instance, when a company's employees arrive at the office, their smartphones may automatically connect to the company Wi-Fi. This may trigger the smartphone (e.g., the mobile device 115-*a*) to send to the LCD server 130-*a* a call ID that includes a user identification number, such as an employee code (e.g., a payroll code). A triggering event that causes mobile device 115-*a* to send the identification number may be described as a significant change event. A significant change event may include entering or leaving a wireless network—e.g., entering a WLAN associated with and connecting to AP 106-*a*. Additionally or alternatively, a significant change event may include performing a cellular mobility procedure, receiving a software update, powering on or off, or the like. As described below, a significant change event may govern the interaction of applications (e.g., a calendar or calling application) on mobile device 115-*a*.

The LCD server 130-*a* may, based on the call ID, generate a number of rules for the employee's smartphone (e.g., mobile device 115-*a*) to use while connected to the company Wi-Fi. For example, the rules may include how calls to other employees are directed depending on the location of one or both employees. The rules may include how certain intra-company calls, whether local, long-distance, or international, are routed—e.g., the rules may include a preference for proprietary voice over internet protocol (VOIP) where possible. Additionally or alternatively, the rules may include how certain extra-enterprise (e.g., outside) calls are handled. In other words, the LCD server 130-*a* may develop a variety of rules to be applied by the mobile device 115-*a*, while the application of the rules may depend on a number of conditions, which may or may not occur; and the mobile device 115-*a* may be configured to determine when and whether to apply the rules. The rules may thus be generated in anticipation of conditions that may lend themselves to LCD options.

Although the foregoing has generally described LCD rules being generated at a remote server, such as the LCD server 130-*a*, those skilled in the art will recognize that the rules may be determined at any number of physical locations. In some examples, the enterprise server 205 may be configured to generate LCD rules. For instance, the mobile device 115-*a* may send a call ID, e.g., via Wi-Fi, to the enterprise server 205, which generates and sends to the mobile device 115-*a* LCD rules to be applied by the mobile device 115-*a*. So, in a scenario in which data security is a real or perceived concern, transmission of call IDs via the network 140-*a* may be avoided by implementing the LCD rule generation entirely within the demarcated area 210.

In other examples, the LCD rules may be generated and applied on the mobile device 115-*a*. Rules generated on the mobile device 115-*a* may supplement LCD rules received from a server. Or, mobile device-generated rules may be used in lieu of server-determined rules—e.g., where physical or computational limitations of the mobile device 115-*a* are not of significant concern. Whether the LCD rules are generated on the mobile device 115-*a* or a server, in various examples, logic for applying the LCD rules (e.g., a mobile application) resides on the mobile device 115-*a*.

In some examples, the mobile device 115-*a* sends a call ID by way of AP 106-*a*, and receives LCD rules in response; and then the mobile device 115-*a* places a call by way of a different sub-network or system. For example, the mobile device 115-*a* may apply LCD rules received from the AP 106-*a* to place a call via a base station 105 (FIG. 1). This call may occur shortly after receiving LCD rules; or it may be made several minutes, hours, or days later. In some cases, the mobile device 115-*a* receives LCD rules while connected to a WLAN; and it applies those rules while the device user is traveling and physically isolated from the WLAN.

The LCD rules may be periodically updated. The rules may be updated in whole or part. A mobile device 115-*a* may, for example, send an updated call ID to the LCD server 130-*a*, and it may receive updated LCD rules for directing a subsequent call. Additionally or alternatively, the LCD server 130-*b* may periodically generate and send updated rules with or without receiving an updated call ID. The updated rules may modify or override earlier received rules.

Figure 3:
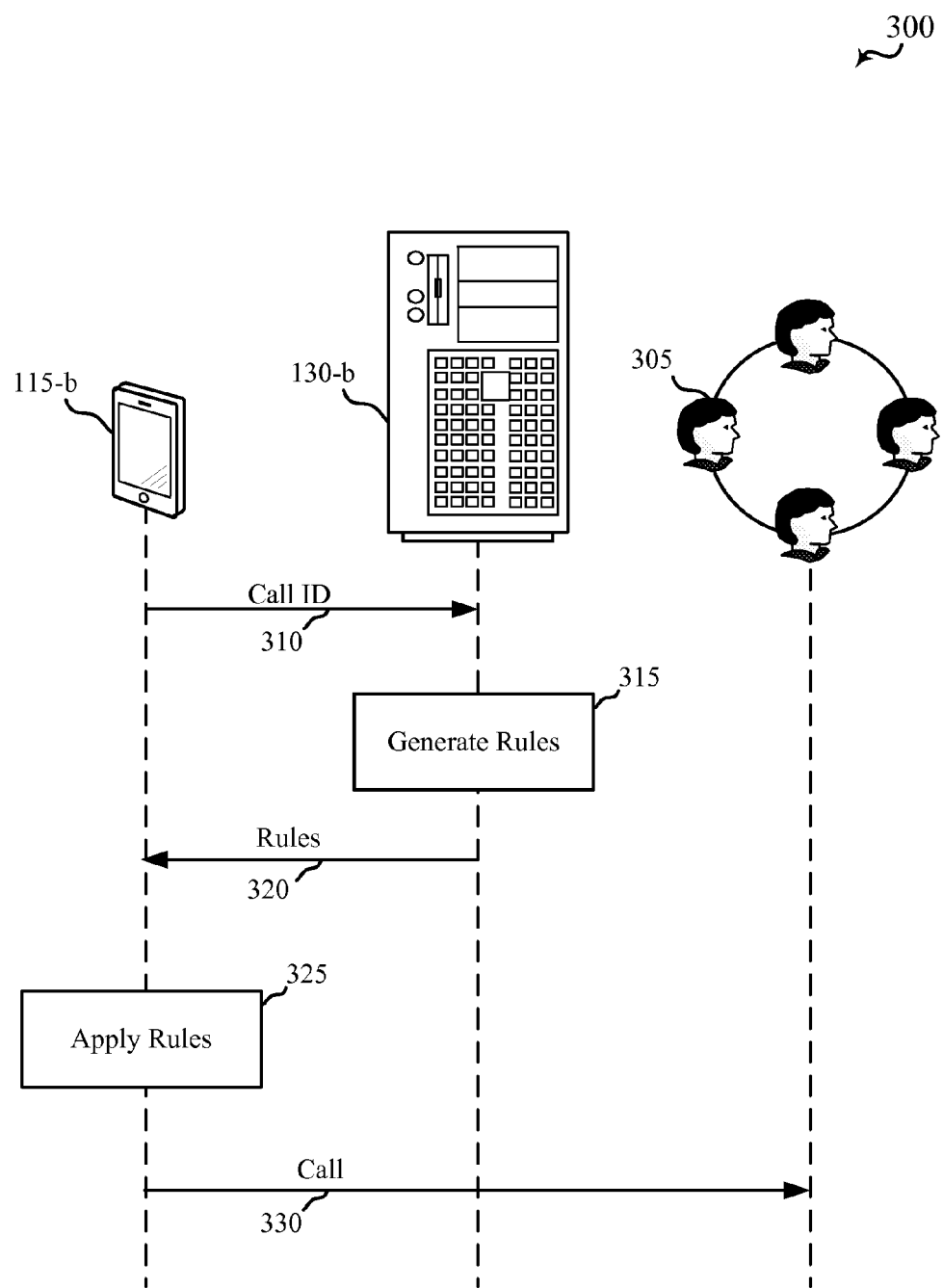
FIG. 3 illustrates an example a call flow within a system that supports LCD in accordance with the present disclosure.

Next, referring to FIG. 3, a call flow diagram 300 illustrates communication within a system that supports LCD. The diagram 300 includes a mobile device 115-*b*, an LCD server 130-*b*, and a virtual conference 305. The devices within the diagram 300 may be examples of the devices described with reference to FIGS. 1 and 2. The virtual conference 305 may be a telephonic conference (e.g., a conference call facilitated by a conference bridge), a video conference, a video-telephony based call, or some combination of voice and video calling.

The mobile device 115-*b* may send 310 a call ID to the LCD server 130-*b*. The call ID may be sent well before a call is attempted—e.g., it may be sent seconds, minutes, hours, or days before—or the call ID may be sent when a call is attempted. Then, the LCD server 130-*b* may generate 315 rules (e.g., LCD rules) and send 320 the generated rules to the mobile device 115-*b*. The mobile device 115-*b* may apply 325 the rules and place 330 a call to the conference 305 based on the applied rules. The call may include a voice call, a video call, or a video telephony call, depending on the capabilities of the mobile device 115-*b* or the conference host. The mobile device 115-*b* may thus determine its present capability to initiate or maintain particular types of calls (e.g., voice, video, or the like), and may apply received rules accordingly. For instance, mobile device 115-*b* may evaluate the state of its battery in determining whether it is capable of making a video call.

In some examples, the call ID includes a conference call number or data indicative of a conference call. For example, a mobile device 115 may be equipped with a one-touch dialing (OTD) conference call application. The OTD application may generate and cause the device 115-*b* to send a call ID in anticipation of a future conference call. In some examples, the OTD application is capable of identifying conference call information (e.g., a dial-in and access code) by scanning a separate calendar application on a mobile device 115. The OTD application may scrape conference call data from the calendar and generate a call ID based on the scraped data. The OTD application may then cause the mobile device 115 to send the call ID to an LCD server 130, which may generate LCD rules based on the call ID, and send the rules to the mobile device 115. Later, at the designated time of the conference call, the OTD application may generate a user interface that allows a device user to join a scheduled conference call by pushing a single button. When the user attempts to join the scheduled conference call, or beforehand, the OTD application may apply the received rules for placing the call. The OTD application may thus be configured for LCD such that it assists in receiving and applying LCD rules with little or no user input. The LCD rules may include a list of possible conference call numbers, which may be generated by comparing the number from the call ID with a database of associated conference call numbers. The LCD rules may direct the mobile device 115-*b* to use a particular number depending on a present location of the mobile device 115-*b*.

In some cases, the OTD application scans the mobile device's 115-*b* calendar every time the mobile device 115-*b* under goes some change in system information or experiences a significant change event, which may include entering or leaving a particular WLAN, performing a cellular mobility operation (e.g., handing over or reselecting to a different base station 105 (FIG. 1)), receiving a software update, powering on or off, or the like. The calendar of a given device 115-*b* may thus be scanned each time the device 115-*b* establishes a connection with a new cell (e.g., a new base station 105 (FIG. 1)).

If the mobile device 115-*b* is equipped with an OTD application, the application may be configured to apply rules in conjunction with other applications on the mobile device 115-*b*. For example, if the LCD rules instruct the mobile device 115-*b* to use a certain telephone number based on a location, the OTD application may, in coordination with other applications on the mobile device 115-*b*, identify the device's 115-*b* location (e.g., via GPS, multilateration calculations, signal strength calculations, etc.) and select the appropriate telephone number to use.

In some examples, when a mobile device 115-*b* attempts to join a conference call, the device sends 310 a call ID to the LCD server 130-*b*, and the call ID includes a dial-in number that the caller intends to use for the conference call (e.g., a conference bridge number). The LCD server 130-*b* may generate 315 rules that determine a different conference bridge number, and the rules may instruct the mobile device 115-*b* to utilize the different number if certain conditions exist. For example, if the mobile device 115-*b* attempts to dial a United States-based telephone number while the device 115-*b* is physically present in India, the generated rules may provide an India-based conference bridge number, and the rules may instruct the device 115-*b* to first attempt using the India-based number. In some examples, the call ID consists of a conference access code without a phone number, and the rules include a list of numbers for the mobile device 115-*b* to select from based on time-of-day, location, available network connections, and the like.

Figure 4:
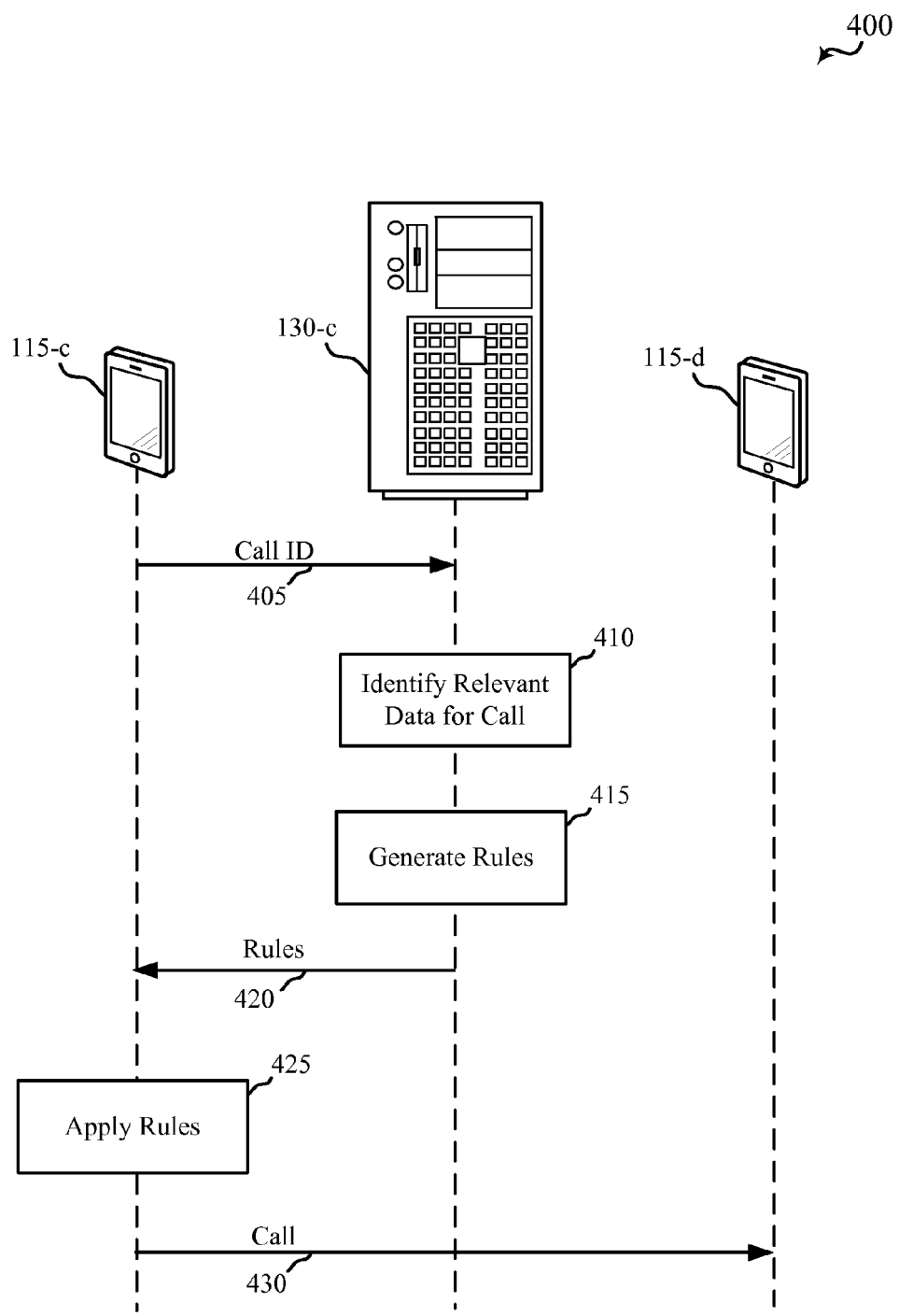
FIG. 4 illustrates an example a call flow within a system that supports LCD in accordance with the present disclosure.

Next, FIG. 4 includes a call flow diagram 400 that depicts communication within a system that supports LCD. The diagram 400 includes mobile devices 115-*c* and 115-*d* and an LCD server 130-*c*. The devices within the diagram 400 may be examples of the devices described with reference to FIGS. 1 and 2. The devices 115 may be configured for voice communication, video communication, or both.

The mobile device 115-*c* may generate and send 405 a call identifier (call ID) to an LCD server 130-*c*. The mobile device 115-*c* may send, and the server 130-*c* may receive, the call ID via a wireless network as described with reference to FIGS. 1 and 2. In some examples, the device 115-*c* generates the call ID by reference to contacts located on the device 115-*c*. For instance, a user of the device 115-*c* may select a callee from a list of contacts. The call ID may include information from the contact, including telephone or video telephony numbers that are available for contacting the callee. The call ID may thus be indicative of a telephone number. As described below, in some case, the mobile device 115-*c* identifies the call ID based on a significant change event.

The LCD server 130-*b* may identify 410 relevant data for a potential call. This may include information related to the locations of the caller or callee, the network availability of caller or caller, technology available for a call (e.g., Wi-Fi, LTE, PSTN, etc.). In some cases, the LCD server 130-*b* is configured with a list of available phone numbers (or alternative means of contacting a callee, such as video telephony), and the call ID represents an identifier of the callee or a preference for quality of service (QoS) for a call. For example, the mobile device 115-*c* may indicate only that the caller wishes to contact a callee, and the caller has a preference for the highest-available resolution for the call. The LCD server 130-*b* may know, a priori, the callee's office, home, or mobile telephone numbers as well as the callee's video-telephony capabilities. The LCD server 130-*b* may evaluate the locations of either or both the caller and callee; and it may consider aspects of the network 140 (FIG. 1) available to connect caller and callee. For example, the LCD server 130-*b* may consider availability of various cellular technologies or Wi-Fi. The LCD server 130-*b* may generate 415 rules accordingly.

In some examples, if both the callee and caller are employees of the same enterprise, the LCD server 130-*b* may be privy to the location of both the caller and callee's mobile devices 115; and the LCD server 130-*b* may generate 415 rules for the caller's mobile device 115-*c* based on the call ID and, for example, on the locations either or both caller and callee. For example, both the caller and callee may be connected to the same WLAN or PBX, and a LCD call may be routed via the WLAN or PBX. In some cases, the LCD server 130-*c* generates 415 rules based on the location of the calling mobile device 115-*c* without considering the location of the callee, and irrespective of whether the caller and callee are able to access a common network. The term location may refer to a geographic location (e.g., city, state, country, GPS coordinates, etc.), physical location (e.g., proximity to other devices or features), location within the coverage area or connection to a particular network (e.g., a WLAN, cellular network, etc.), or the like.

The generated rules may include directions for when or how the mobile device 115-*c* should place a call, and certain rules may be applicable, or not, based on a location of the mobile device 115-*c* when the mobile device places a call. In some examples, the rules may include directions that may be applicable based on whether the mobile device 115-*c* is connected to or utilizing a wireless network that is operated by a service provider that supports or others has a relationship to the wireless device (e.g., HPLMN, VPLMN, etc.). The mobile device 115-*c* may, for example, send the call ID via one wireless network, and the rules may direct the mobile device 115-*c* to use a different wireless network for placing a call. The rules may also include directions that may be applicable to the mobile device 115-*c* based on whether the mobile device can support a particular call type (e.g., voice only, video only, video telephony, etc.). In some cases, the call ID is indicative of one telephone number and the rules direct the mobile device 115-*c* to utilize a different telephone number for a callee associated with the call ID.

The LCD server 130-*b* may then send 420 the rules to the mobile device 115-*c*, which may be applied 425 by the device 115-*c* in placing 430 a call to the mobile device 115-*d*. The mobile device 115-*c* may identify its current location in order to apply the received rules. Likewise, the mobile device 115-*c* may determine a service provider associate with a network with which the mobile device 115-*c* is connected, has a subscription, or the like, and the mobile device 115-*c* may apply the rules accordingly. Additionally or alternatively, the mobile device 115-*c* may determine its capability to initiate a call type (e.g., voice, video, video telephony, etc.), and apply the rules accordingly.

By way of example, rules, which may be referred to as LCD rules, may include a hierarchy of numbers for use in the placing the call. The rules may instruct the mobile device 115-*c* to attempt to use different sub-systems or technologies in placing the call (e.g., VOIP, VOIP over LTE, PTSN, etc.) depending on a present location or mobility of the device 115-c.

Based on a consideration of these and similar variables, the LCD server 130-b may generate 415 and send 420 rules to the mobile device 115-c to apply 425 in placing 430 a call to the mobile device 115-d.

Figure 5A:
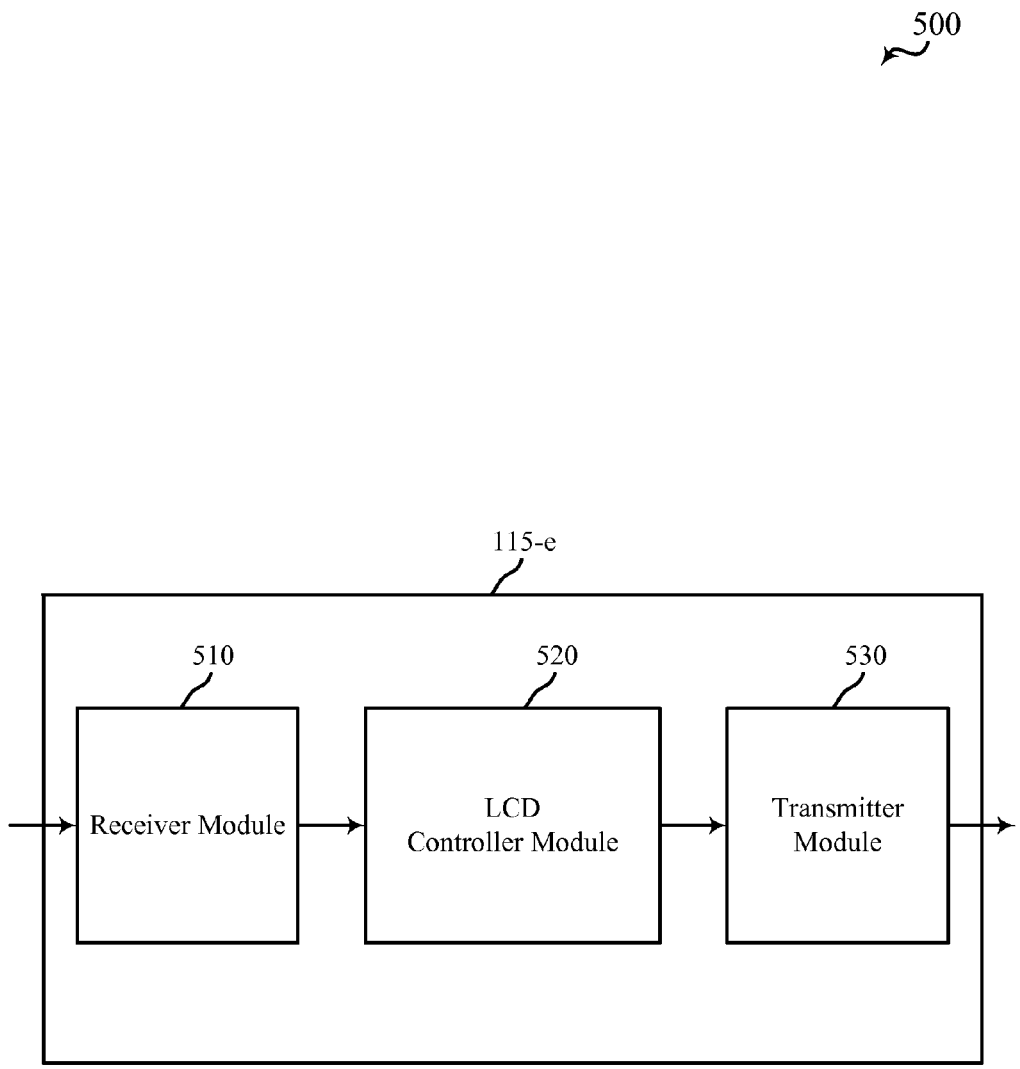
FIGS. 5A and 5B illustrate examples of a mobile device or devices that support LCD in accordance with the present disclosure.

Referring now to FIG. 5A, a block diagram 500 depicts a mobile device 115-e that supports LCD. The mobile device 115-e may illustrate aspects of the mobile devices 115 described in FIGS. 1, 2, 3, and 4. In various embodiments, the mobile device 115-e includes a receiver module 510, an LCD controller module 520, or a transmitter module 530, each of which may be in communication with one another. One or more modules of the mobile device 115-e may be processors.

The mobile device 115-e, and its various components may be means for performing the functions described herein. For instance, the LCD controller module 520 may be configured to generate a call ID and the transmitter module 530 may be configured to send the call ID to a server. In some examples, the LCD controller module 520 is configured to generate LCD rules. The receiver module 510 may be configured to receive one or more rules (e.g., signals or data packets representing rules) for directing a call. In some cases, the LCD controller module 520 is further configured to apply the rules or operate the mobile device 115-e for placing a call according to the received rules. The transmitter module 530, in combination with the LCD controller module may be configured to place the call based on the applied rules.

In some examples, the LCD controller module 520, in combination with the transmitter module 530, is configured to dynamically update and send updated call IDs to the server. The call IDs may be updated to reflect changes in mobile device 115 location, network availability, user preference, and the like. The receiver module 510 may further be configured to receive and, in combination with the LCD controller module 520, apply the one or more rules. In some examples, the LCD controller may decide whether or when to apply LCD rules.

Figure 5B:
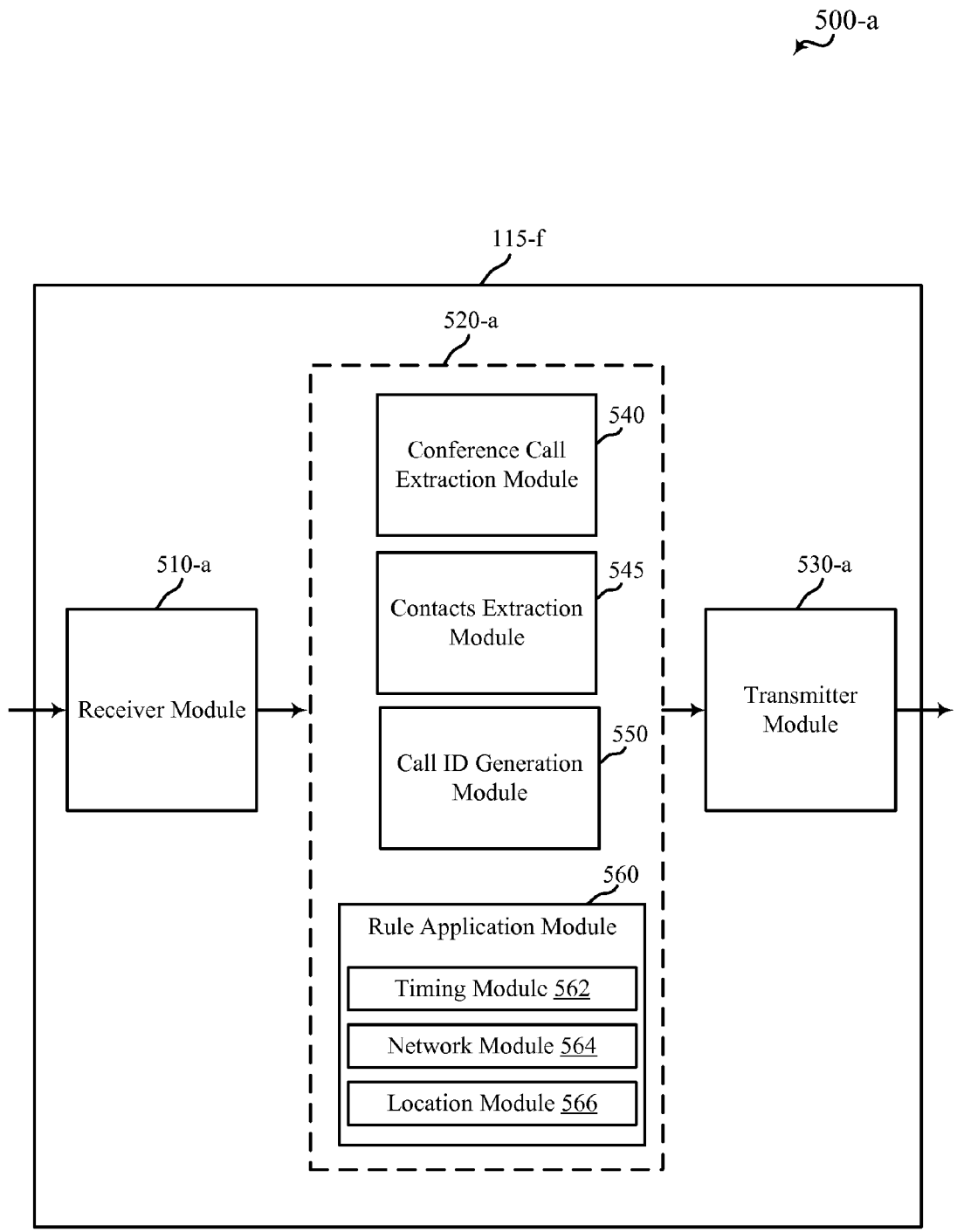

Next, in FIG. 5B, a block diagram 500-a depicts a mobile device 115-f that supports LCD. The mobile device 115-f may illustrate aspects of the mobile devices 115-f described in FIG. 1, 2, 3, 4, or 5A. The mobile device 115-f may include a receiver module 510-a, an LCD controller module 520-a, or a transmitter module 530-a, each of which may be in communication with one another. The various modules of the mobile device 115-f may be examples of the corresponding modules of FIG. 5A. In some examples, the modules of the mobile device 115-f are aspects of a processor or processors.

The LCD controller module 520-a may be configured with a conference call extraction module 540, a contacts extraction module 545, a call ID generation module 550, or a rule application module 560. The extraction modules 540 and 545 may be configured to extract data upon the request of one or more applications, such as a conference calling application, or a push notification from a server. The conference call extraction module 540 and the contacts extraction module may each be configured to scan various applications or databases present on the mobile device 115-f. For instance, the conference call extraction module 540 may be configured to scan a calendar application operating on the device 115-f, and it may be configured to identify and extract data indicative of an upcoming conference call.

In some examples, the contacts extraction module 545 may be configured to scan contacts or address book applications operating on the device 115-f. The contacts extraction module 545 may be configured to identify and extract data related to telephone numbers, video-telephony numbers (or user identities), or locations. In some examples, the contacts extraction module 550 is configured to scrape certain identifying information from a contact for purposes of generating a call ID. For instance, the contacts extraction module 545 may be configured to scrape an email address, telephone number, or other data from a contact of a callee, and to provide the scraped data to the call ID generation module 550.

In other examples, the contacts extraction module 545 may be configured to scrape telephone numbers or video-telephony information from one or more contacts by applying rules received from an LCD server 130 or by applying rules generated by the LCD controller. For example, the mobile device 115-f may receive a rule indicating that the device 115-f should evaluate different possibilities for placing a call based on network availability. A rule may thus indicate that the mobile device 115-f should attempt a video telephony call if the device 115-f is connected to Wi-Fi, for example, and if the device 115-f has access to the callee's video-telephony information. In order to apply such a rule, the contacts extraction module 545 may identify a contact associated with the callee, scan it for both telephone numbers and video-telephony information, and scrape the video-telephony information if found. The contacts extraction module 545 may convey the extracted information (e.g., the scraped telephone and video-telephony information) to other modules (e.g., the rules application module) of the device 115-f for use in placing the call.

The call ID generation module 550 may, based on data extracted by the extraction modules 540 or 545, generate a call ID. Additionally or alternatively, the call ID generation module 560 may be configured to identify and compile data related to location, network availability, or technical capabilities of the mobile device 115-f. In some cases, the call ID generation module 550 may be configured to identify a significant change event and identify a call identifier based on the significant change event. In some examples, the call ID generation module 550 is also configured to generate a call ID based on user preferences or user identification. The call ID generation module 550 in combination with the transmitter module 530-a may be configured to send a generated call ID to a server. In other examples, the call ID generation module 550 may be configured to generate rules to be applied by the mobile device 115-f without the necessity of sending the call ID to a server.

The device 115-f may be configured to receive one or more LCD rules responsive to the call ID—e.g., via the receiver module 510-a. In some examples, the rule application module 560 is configured to process the received rules, and to operate the mobile device 115-f according to the LCD rules. The rule application module 560 may be configured with a timing module 562, a network module 564, or a location module 566. Each of these modules may be configured to process or implement various LCD rules. For example, the timing module 562 may include a timer or it may be configured to determine when to apply time-based rules. In some examples, the timing module 562 is configured to determine when to dial a particular number—e.g., if an LCD rule indicates that that number should be used if a call is placed within a given timeframe.

The network module 564 may be configured to determine when to apply network-based rules. For instance, the network module 564 may be configured to evaluate the signal strength or QoS parameters of various subsystems or technologies available for making a call; and it may be configured to cause a certain call type (e.g., VOIP over LTE (VoLTE), video telephony, etc.) to be made when certain network conditions exist. In some examples, the network module 564 may be configured to determine a server provider associated with the wireless network to which the mobile device **115-*f* is connected. Additionally or alternatively, the network module 564 may be configured to determine a capability of the mobile device 115-*f*** for initiating a call type, as described above.

The location module 566 may be configured to determine when to apply location-based rules. By way of example, the location module 566 evaluates, in combination with other systems within the mobile device **115-*f*, when to cause the mobile device 115-*f* to utilize certain numbers or calling techniques triggered by a physical location. The location module 566 be configured to determine a geographic location of the mobile device 115-*f***.

In some examples, the rule application module 560, including its various submodules, is configured to generate LCD rules which may be applied by the mobile device **115-*f*. LCD rules generated by the rule application module 560** may be supplemental to, or generated in lieu of rules generated by and received from an LCD server.

The components of the mobile devices 115 of FIGS. 5A and 5B may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 6:
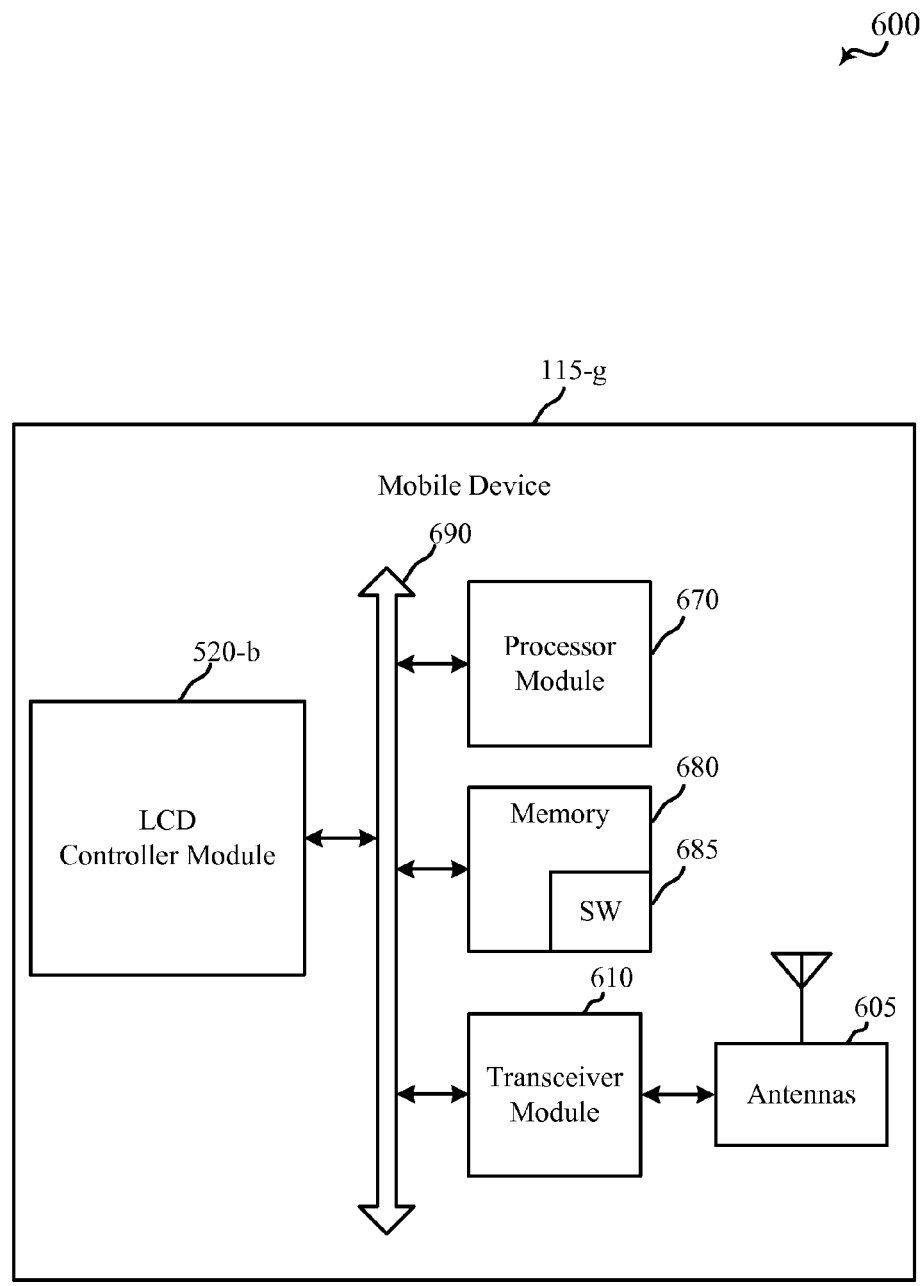
FIG. 6 illustrates an example of a mobile device that supports LCD in accordance with the present disclosure.

Next, in FIG. 6, a block diagram 600 depicts a mobile device **115-*g* that supports LCD. The mobile device 115-*g* may be a wireless phone, a cellular phone, a smartphone, or portable computer (e.g., laptop, notebook, netbook, tablet, etc.). The mobile device 115-*g* may include an internal power supply (not shown). The mobile device 115-*g* may be, or may include means for performing the functions described herein. In some embodiments, the mobile device 115-*g* is an example of the mobile devices 115 of FIG. 1, 2, 3, 4, 5A, or 5B**.

The mobile device **115-*g* may generally include components for bi-directional voice and data communications, including components for transmitting communications and components for receiving communications. The mobile device 115-*g* may include antenna(s) 605, a transceiver module 610, a processor module 670, and memory 680 (including software (SW) 685), which each may communicate with one another over a bus 690. The transceiver module 610 may be configured to communicate bi-directionally, via the antenna(s) 605 or one or more wired or wireless links, with one or more subsystems or technologies of the network 140 (FIG. 1), as described above. In some examples, the transceiver module 610 is configured to communicate bi-directionally with base stations 105 or APs of FIG. 1. The transceiver module 610 may include a modem configured to modulate the packets and provide the modulated packets to the antenna(s) 605 for transmission, and to demodulate packets received from the antenna(s) 605. While the mobile device 115-*g* may include a single antenna 605, the mobile device 115-*g* may have multiple antennas 605** capable of concurrently transmitting or receiving multiple wireless transmissions.

The memory 680 may include random access memory (RAM) and read-only memory (ROM). The memory 680 may store computer-readable, computer-executable software or firmware code 685 containing instructions that are configured to, when executed, cause the processor module 670 to perform various functions described herein (e.g., extracting data from calendar or contacts applications, generating call IDs, applying LCD rules, etc.). Alternatively, the software/firmware code 685 may not be directly executable by the processor module 670 but may be configured to cause a computer (e.g., when compiled and executed) to perform functions described herein. The processor module 670 may include an intelligent hardware device, e.g., a central processing unit (CPU), a microcontroller, an application-specific integrated circuit (ASIC), etc.

In some examples, the mobile device **115-*g* includes an LCD controller module 520-*b*, which may be substantially the same as the LCD controller modules 520 of FIGS. 5A and 5B. In some cases, the LCD controller module 520-*b* is configured to perform the functions of the modules 540, 545, 550 or 560 of FIG. 5B. The LCD controller module 520-*b* may be a component of the mobile device 115-*g* in communication with some or all of the other components of the mobile device 115-*g* via the bus 690. Alternatively, the functionality of the LCD controller module 520-*a* may be implemented as a component of the transceiver module 610, as a computer program product, or as one or more elements of the processor module 670**.

Figure 7A:
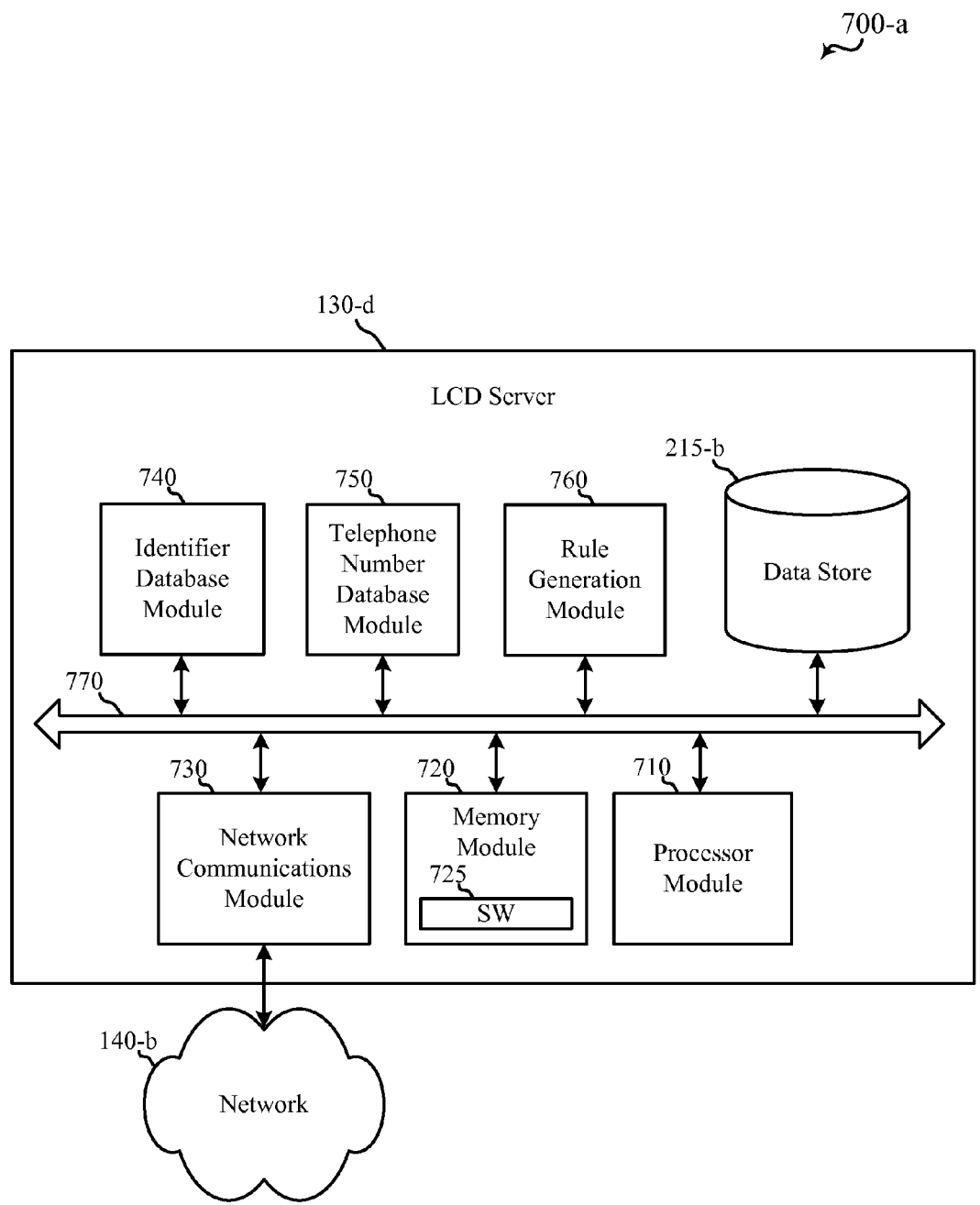
FIG. 7A illustrates an example of a wireless communications system that supports LCD in accordance with the present disclosure.

Turning next to FIG. 7A, a block diagram illustrates a system **700-*a* that supports LCD. The system includes an LCD server 130-*d*, a network 140-*b*, and a data store 215-*b*, each of which may be examples of the corresponding aspects of FIG. 1, 2, 3, or 4. The LCD server 130-*d* may include a processor module 710, a memory module 720 (including software (SW) 725), a network communications module 730, an identifier database module 740, a telephone number database module 750, or a rule generation module 760. Each of these modules may be in communication with one another— via a bus 770**, for example.

The LCD sever **130-*d* may be a means for performing the various function described herein. For example, the LCD server 130-*d* may be configured to receive, via the network 140-*b* and the network communications module 730, call IDs from mobile devices 115 (FIG. 1, 2, 3, 4, 5A, or 5B). The network communications module 730 may be configured to communicate bi-directionally, via one or more wired or wireless links, with one or more subsystems or technologies of the network 140-*b*, as described above. In some examples, the network communications module 730 is configured to communicate bi-directionally with base stations 105 or APs 106 of FIG. 1 via backhaul links 132 (FIG. 1). The network communications module 730 may include a modem configured to modulate packets (e.g., LCD rules) for transmission to mobile devices 115, and to demodulate packets (e.g., call IDs) received via the network 140-*a***.

The identifier database module 740 may be configured to communicate with or manage a database related to call IDs. For example, the identifier database module 740 may communicate with and manage a database of call IDs stored in the data store **215-*b*. In some examples, the identifier database module 740 is configured to compare a call IDs (e.g., employee identifier, contacts information, preferred numbers, etc.) to a database of known identifiers. The identifier database module 740** may be configured to retrieve contact-related data from such databases, which may be used in generating LCD rules.

In some examples, the telephone number database module 750 is configured to communicate with or manage a database related to telephone numbers, such as conference numbers. For instance, the telephone number database module 740 may communicate with and manage a database of call IDs stored in the data store 215-*b*. The telephone number database module may be configured to retrieve a list of available telephone numbers based on a received call ID, and the retrieved telephone numbers may be used in generating LCD rules. The rule generation module 760 may be configured to generate LCD rules based on received call IDs. For instance, the rule generation module 760, in combination with the database modules 740 and 750, may be configured to generate LCD rules for directing calls from direct mobile devices 115 based on availability of telephone numbers, caller location, intended-recipient location, time-of-day, quality-of-service requirements, network availability, internet connectivity, and the like. In some examples, the functionality of the identifier and telephone number database modules 740 and 750, and the rule generation module 760, is combined in a single module. In some examples, the processor module 710, which may include an intelligent hardware device (e.g., a CPU), performs various operations related to LCD.

The memory module 720 may include RAM or ROM, or both. In some examples, the memory module 720 stores computer-readable, computer-executable software code 725 containing instructions that are configured to, when executed, cause the processor module 710 to perform various functions described herein. In other examples, the software code 725 is not directly executable by the processor module 710; but the software code 725 may be configured to cause a computer, e.g., when compiled and executed, to perform the functions described herein.

In some examples, a mobile device 115 is configured to perform some or all of the functionality of the various LCD server 130-*d* modules. For instance, the processor module 670 of FIG. 6 may be configured to perform the function of the rule generation module 760. In such cases, the mobile device 115 may send a call ID to the LCD server 130-*d*, and the server 130-*d* may respond with information from various databases, which the mobile device 115 may use to generate rules to direct its calls. In other examples, the mobile device 115 is equipped with one or more databases (e.g., in the memory module 680), and the processor 670 is configured to perform the functions of the identifier database module 740 or the telephone number database module 750.

In FIG. 7B, illustrates call-related data 700-*b* that may be utilized for LCD. The call-related data 700-*b* may be stored in a database (e.g., on the data store 215-*a* or memory module 720 or FIG. 7A, memory module 680 of FIG. 6, etc.) and it may be accessed by various modules of an LCD server 130 or a mobile device 115. The call-related data 700-*b* may include a list of known IDs 780, a list of network service providers 782, a list of possible locations 784, or a list of available numbers 786. In various examples, the data 700-*b* may include additional (or fewer) categories of information. For example, the data 700-*b* may include information about various call technologies, capabilities of various wireless devices, time-of-day, or other call-related information described herein.

The identifier database module 740, the telephone number database module 750, or the rule generation module 760 of FIG. 7A may access the data 700-*b* and generate LCD rules accordingly. For example, the LCD server 130-*d* may receive a call ID via the network 140-*b*. The network communications module 730 or the processor module 710 may extract a unique identifier from the call ID; and in some examples, the call ID is the unique identifier. The unique identifier may be representative of a particular mobile device 115 or a callee, or both. For instance, a unique identifier may be an employee identification number that is included in communications from a mobile device 115. The identifier database module 740 may access and search the data store 215-*b* utilizing the unique identifier. The database search may return some of the data 700-*b*. For instance, if the unique identifier in the call ID is "xy72L," the database search may return values for network server provider 782, location 784, or available number 786 associated with "xy72L."

The rule generation module 760 may then generate dialing rules for a mobile device 115 based on the data 700-*b*. The rules may be LCD rules for limiting the price or cost of various calls placed by a mobile device 115 with a unique identifier "xy72L." One example of LCD rules is as follows:

(1) if the mobile device 115 is connected to the network of Provider X, and the mobile device 115 is located within the Denver, Colo. metro area, then dial 720-123-4567 to reach the callee;

(2) else if the mobile device 115 is connected to a network other than Provider X, and the mobile device 115 is located in the United States, but outside of the Denver metro area, then dial 800-123-4567 to reach the callee;

(3) else if the mobile device 115 is connected to a network other than Provider X, and is located outside the United States, then dial 00-1-720-123-4567 to reach the callee.

Other combinations of data 700-*b* may be employed to generate rules for limiting cost, maximizing security, maximizing reliability, or the like. Those skilled in the art will recognize that aspects of the mobile device 115, such as at the LCD control modules 520 (FIG. 5A, 5B, or 6), may be configured to generate some or all of the LCD rules described above.

Figure 8:
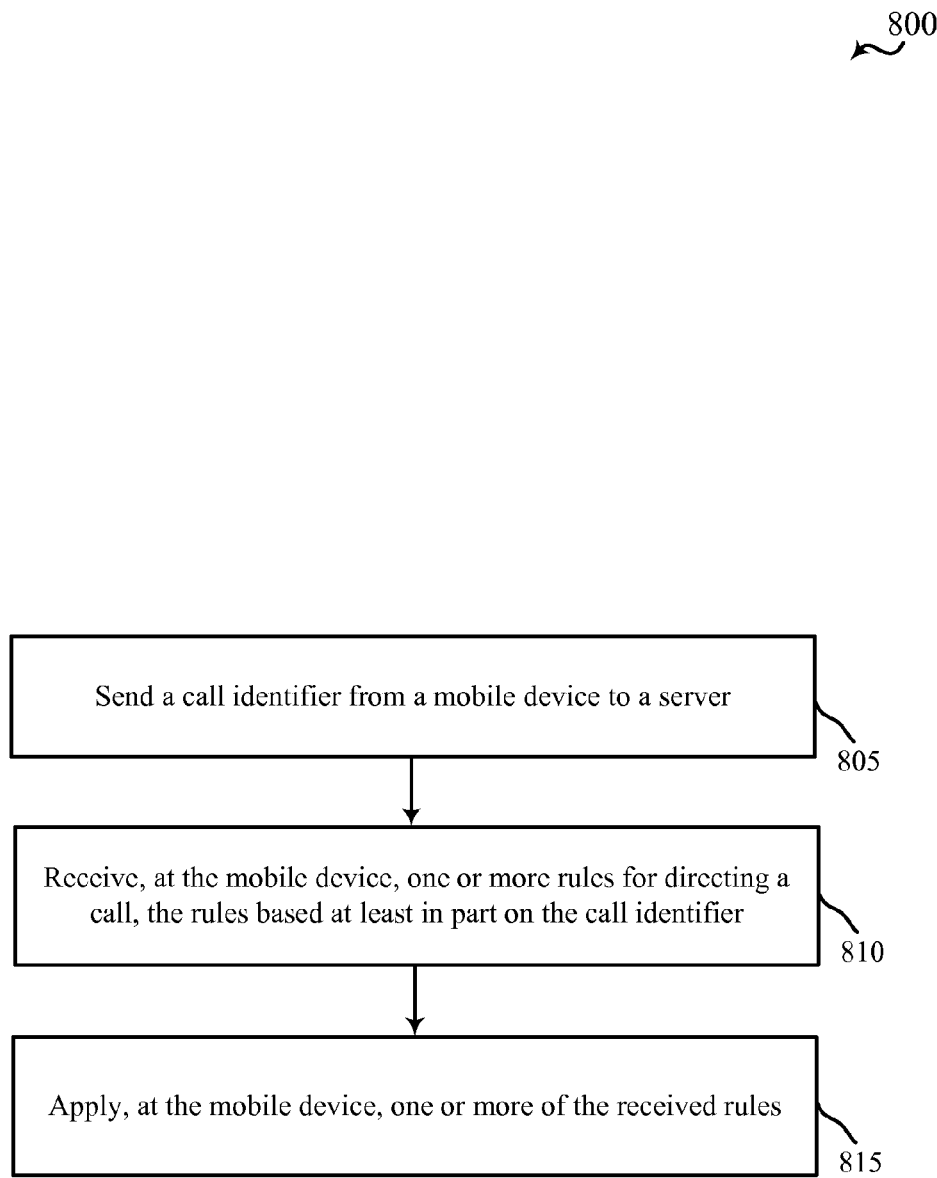
FIGS. 8-14 illustrate an example method or methods of LCD according to the present disclosure.

Next, in FIG. 8, a flow diagram depicts an example method 800 of LCD. The method 800 may be implemented by the mobile devices 115 described in the preceding figures. For example, various aspects of the method 800 may be performed by one or more of the receiver modules 510, the LCD controller modules 520, or the transmitter modules 530 of FIG. 5A or 5B. In some examples, the method 800 is performed by the LCD controller module 520-*a*, the transceiver module 610, or antenna(s) module 605 of FIG. 6.

At block 805, the method may include sending a call identifier from a mobile device to a server. The call identifier may include a telephone number or a user identification number. The telephone number or user identification number may be indicative of a callee. For instance, a telephone number may be for a callee or may include a name or other contact information (e.g., an employee identification number) for a callee.

At block 810, the method may include receiving, at the mobile device, one or more rules for directing a call. The rules may be based, in part, on the call identifier. In some cases, the rules involve directing the call to a designated telephone number when one or more conditions are met. For example, a mobile device 115 may be instructed to dial a particular number when variables relating to location, network access, time-of-day, or intended recipient meet certain conditions prescribed by an LCD server 130. In some examples, the call identifier includes a first telephone number, and the rules involve directing a mobile device 115 to call a second telephone number upon certain conditions being met (e.g., a certain location of caller or callee), and the second telephone number may be different from the first. The rules may be based, wholly or partially, on data retrieved from comparing the call identifier to a database of known identifiers.

At block 815, the method may include applying, at the mobile device, one or more of the received rules. The mobile device may thus make a call in accordance with one or more received rules. In some cases, the call identifier is sent over unlicensed spectrum (e.g., Wi-Fi), and the subsequent call, based on the received rules, is placed via licensed spectrum (e.g., via a cellular carrier). In some examples, the method additionally includes sending an updated call identifier to the server and receiving, at the mobile device, updated rules for directing a subsequent call. The updated rules may be based on the updated call identifier.

Figure 9:
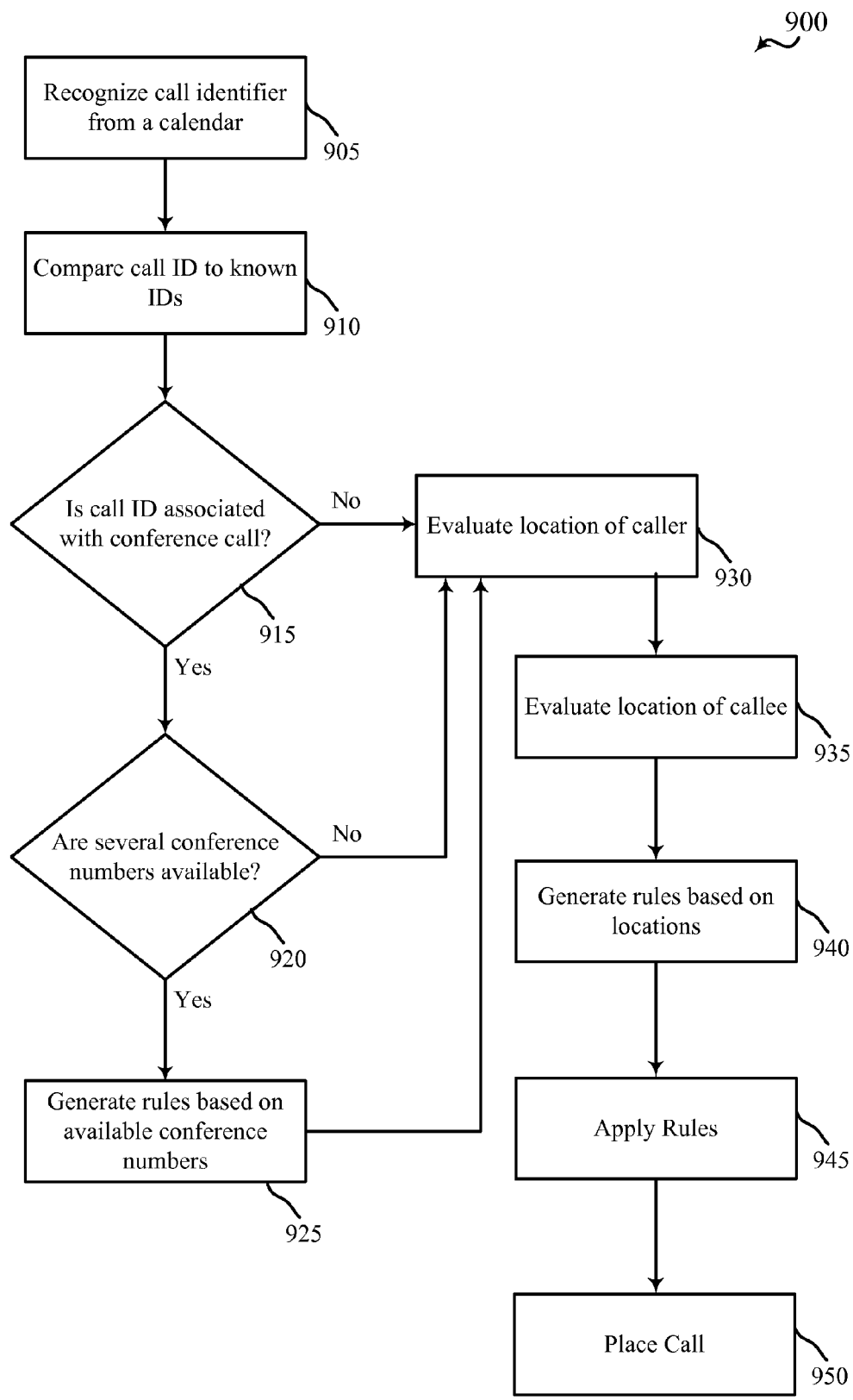

In FIG. 9, a flow diagram depicts an example method 900 of LCD. The method 900 may be an example of the method 800. The method 900 may be implemented by the base stations 105, the APs 106, or the mobile devices 115 described with reference to the preceding figures. For example, various aspects of the method 900 may be performed by one or more of the receiver modules 510, the LCD controller modules 520, or the transmitter modules 530 of FIG. 5A or 5B. In some examples, aspects of the method 900 are performed by the LCD controller module 520-a, the transceiver module 610, or antenna(s) module 605 of FIG. 6. Additionally or alternatively, aspects of the method 900 may be performed by the identifier database module 740, the telephone number database module 750, or the rule generation module 760 of FIG. 7.

At block 905, the method may include recognizing a call identifier from a calendar. For instance, a call identifier may include dial-in information for a conference call, which may be included in a meeting invitation stored in a calendar application of a mobile device 115. The conference call information may be extracted from a meeting invitation and used to generate a call ID, which may be sent from a mobile device 115 to a server.

At block 910, the method may involve comparing the call identifier to known identifiers. Then, at block 915, the method may include determining whether the call identifier is associated with a conference call. If yes, the method may involve, at block 920, determining whether several conference numbers are available. If yes, the method may include, at block 925, generating rules based on available conference numbers. But if the answer to either inquiry at blocks 915 and 920 is no, or upon generating rules at block 925, the method may involve, at block 930, evaluating the location of the caller. Then, at block 935, the method may include evaluating the location of the callee.

At block 940, the method may further include generating rules based on locations of the caller and callee. At block 945, the method may involve applying the rules (e.g., at a mobile device 115); and at block 950, it may include placing a call (e.g., from the mobile device 115) according to the applied rules.

Figure 10:
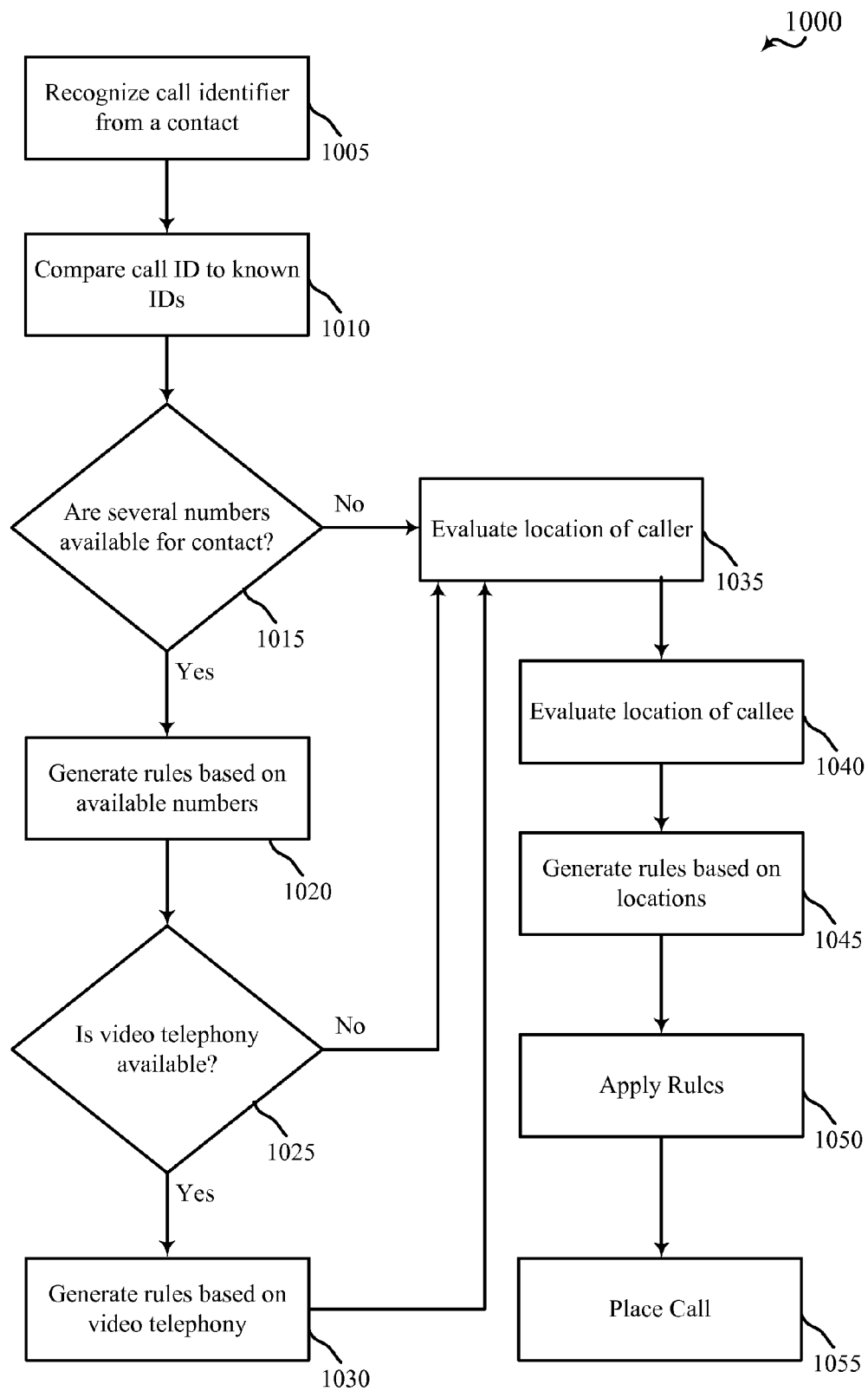

Next, in FIG. 10, a flow diagram depicts an example method 1000 of LCD. The method 1000 may be an example of the methods 800 or 900. The method 1000 may be implemented by the base stations 105, the APs 106, or the mobile devices 115 described with reference to the preceding figures. For example, various aspects of the method 1000 may be performed by one or more of the receiver modules 510, the LCD controller modules 520, or the transmitter modules 530 of FIG. 5A or 5B. In some examples, aspects of the method 1000 are performed by the LCD controller module 520-a, the transceiver module 610, or antenna(s) module 605 of FIG. 6. Additionally or alternatively, aspects of the method 1000 may be performed by the identifier database module 740, the telephone number database module 750, or the rule generation module 760 of FIG. 7.

At block 1005, the method may include recognizing a call identifier from a contact. For instance, a call identifier may include some or all call-related data (e.g., telephone numbers, video telephony information, etc.) from a contact stored in an address book-type application of a mobile device 115. Information may be extracted from a contact and used to generate a call ID, which may be sent from a mobile device 115 to a server.

At block 1010, the method may involve comparing the call identifier to a database of known identifiers. Then, at block 1015, the method may include determining whether several numbers are available for the calling a party associated with the contact—e.g., whether various mobile, office, or home numbers are available. If yes, the method may involve, at block 1020, generating rules based on the available numbers.

At block 1025, the method may include, determining whether video telephony is available. If yes, the method may involve, at block 1030 generating rules based on video telephony. If the answer to either inquiry regarding the availability of several numbers (block 1015) or video telephony (block 1025) is no, or upon generating rules based on video telephony, the method may include, at block 1035, evaluating the location of the caller. Then, at block 1040, the method may include evaluating the location of the callee.

At block 1045, the method may further include generating rules based on locations of the caller and callee. At block 1050, the method may involve applying the rules (e.g., at a mobile device 115); and at block 1055, it may include placing a call (e.g., from the mobile device 115) according the applied rules.

Figure 11:
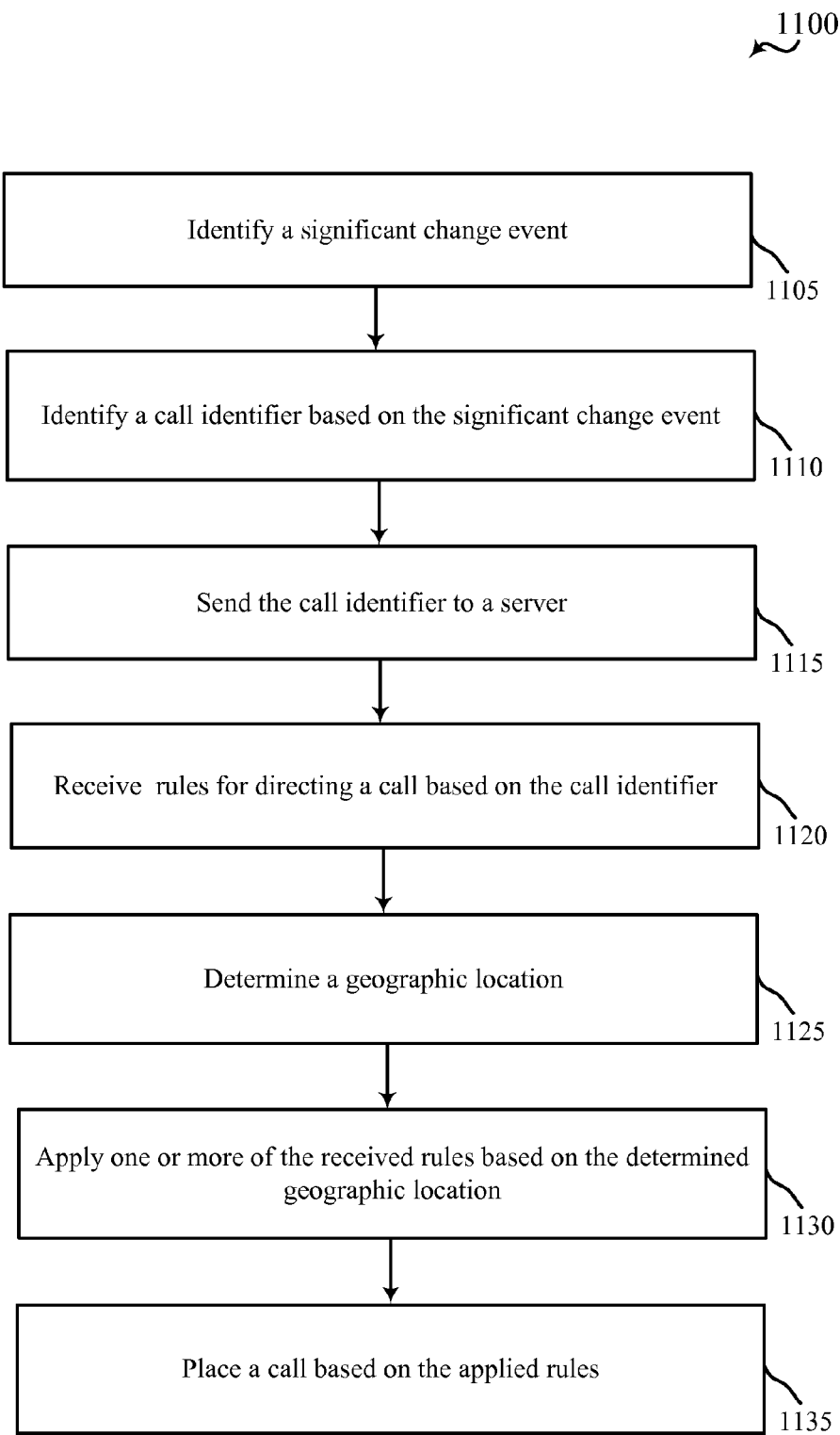

Next, in FIG. 11, a flow diagram depicts an example method 1100 of LCD. The method 1100 may be implemented by a mobile device 115 described in the preceding figures. For example, various aspects of the method 1100 may be performed by one or more of the receiver modules 510, the LCD controller modules 520, or the transmitter modules 530 of FIG. 5A or 5B. In some examples, the method 1100 is performed by the LCD controller module 520-a, the transceiver module 610, or antenna(s) module 605 of FIG. 6.

At block 1105, the method may include identifying a significant change event of a mobile device. The significant change event may include entering or leaving a wireless network, performing a cellular mobility operation, receiving a software update, powering on or off, or the like. At block 1110, the method may include identifying a call identifier based at least in part on the significant change event.

At block 1115, the method may include sending a call identifier from the mobile device to a server. The call identifier may include a telephone number or a user identification number. The telephone number or user identification number may be indicative of a callee. In some examples, the call identifier is indicative of a telephone number, such as a telephone number for the callee. For instance, the call identifier may be for a callee or may include a name or other contact information (e.g., an employee identification number) for a callee.

At block 1120, the method may include receiving, at the mobile device, one or more rules for directing a call. The rules may be based, in part, on the call identifier. In some cases, the rules involve directing the call to a designated telephone number when one or more conditions are met. For example, a mobile device 115 may be instructed to dial a particular number when variables relating to location, network access, time-of-day, or intended recipient meet certain conditions prescribed by an LCD server 130. The rules may be based, wholly or partially, on data retrieved from comparing the call identifier to a database of known identifiers.

At block 1125, the method may include the mobile device determining its geographic location. This may be based on GPS, information communicated from a network, or the like, as described above. In some examples, the presence of the mobile device within a particular network—e.g., a particular WLAN, such as the WLAN described with reference to FIG. 2—may be utilized to determine the location of the mobile device. For instance, the mobile device's presence within a network may represent the location of the mobile device.

At block 1130, the method may include applying, at the mobile device, one or more of the received rules. The mobile device may thus, at block 1135, make a call in accordance with one or more received rules, which may, for example, include applying the rules based on the determined location of the mobile device. In some cases, the call identifier is sent over unlicensed spectrum (e.g., Wi-Fi), and the subsequent call, based on the received rules, is placed via licensed spectrum (e.g., via a cellular carrier). In some examples, the method additionally includes sending an updated call identifier to the server and receiving, at the mobile device, updated rules for directing a subsequent call. The updated rules may be based on the updated call identifier.

Figure 12:
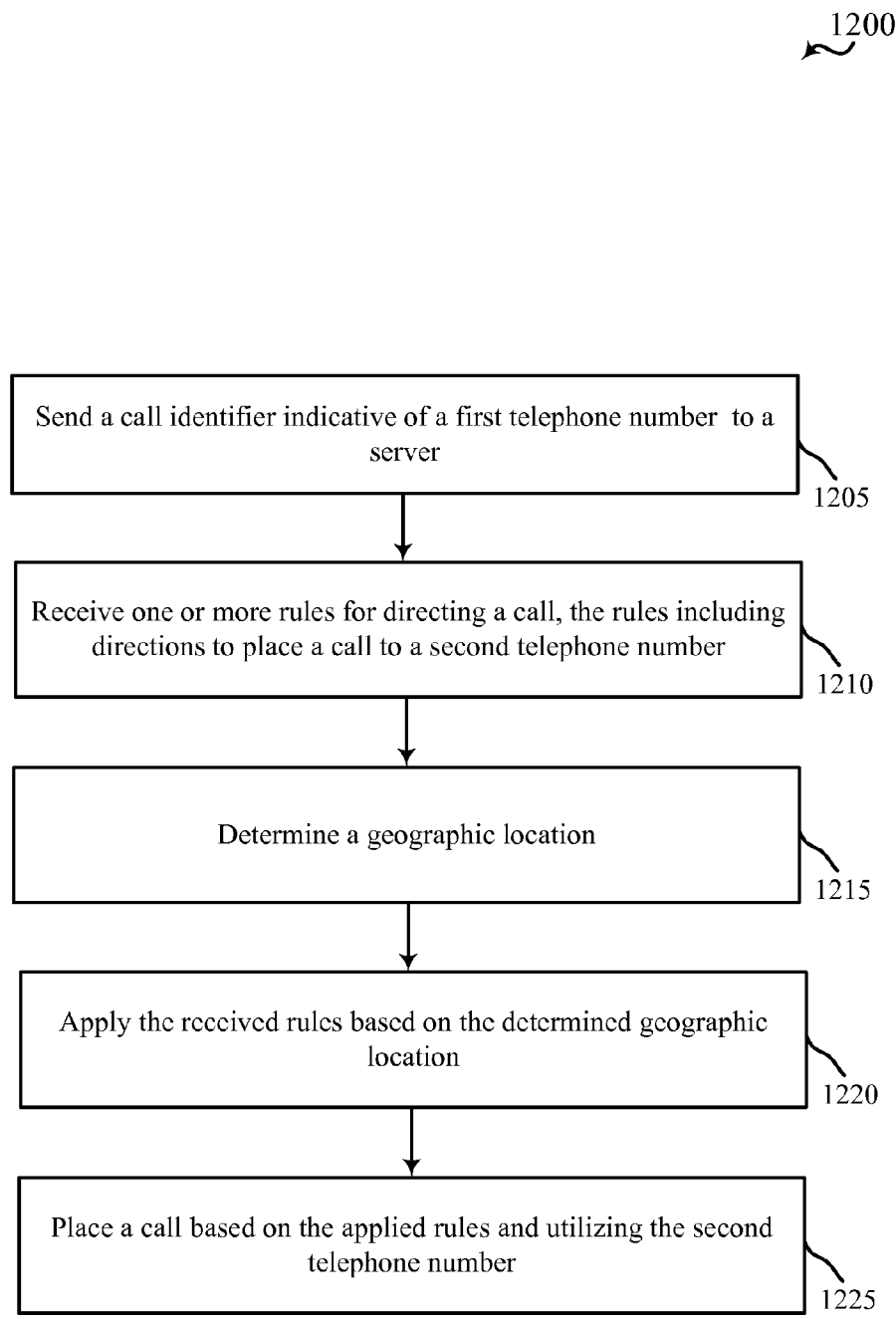

FIG. 12 includes a flow diagram that depicts an example method 1200 of LCD. The method 1200 may be implemented by a mobile device 115 described in the preceding figures. For example, various aspects of the method 1200 may be performed by one or more of the receiver modules 510, the LCD controller modules 520, or the transmitter modules 530 of FIG. 5A or 5B. In some examples, the method 1200 is performed by the LCD controller module 520-a, the transceiver module 610, or antenna(s) module 605 of FIG. 6.

At block 1205, the method may include sending a call identifier from a mobile device to a server. The call identifier may include a telephone number or a user identification number. The identification number may be indicative of a callee. For instance, a the call identifier may be for a callee or may include a name or other contact information (e.g., an employee identification number) for a callee.

At block 1210, the method may include receiving, at the mobile device, one or more rules for directing a call. The rules may be based, in part, on the call identifier. The rules may include involve directing the call to a designated telephone number when one or more conditions are met. The rules may include directions for the mobile device to call a second telephone number upon certain conditions being met (e.g., a certain location of caller or callee), and the second telephone number may be different from the first.

At block 1215, the method may include the mobile device determining its geographic location. This may be based on GPS, information communicated from a network, or the like.

At block 1220, the method may include applying, at the mobile device, one or more of the received rules, which may be based on the determined location. The mobile device may thus make a call in accordance with one or more received rules, which may include, at block 1225, placing a call utilizing the second telephone number.

Figure 13:
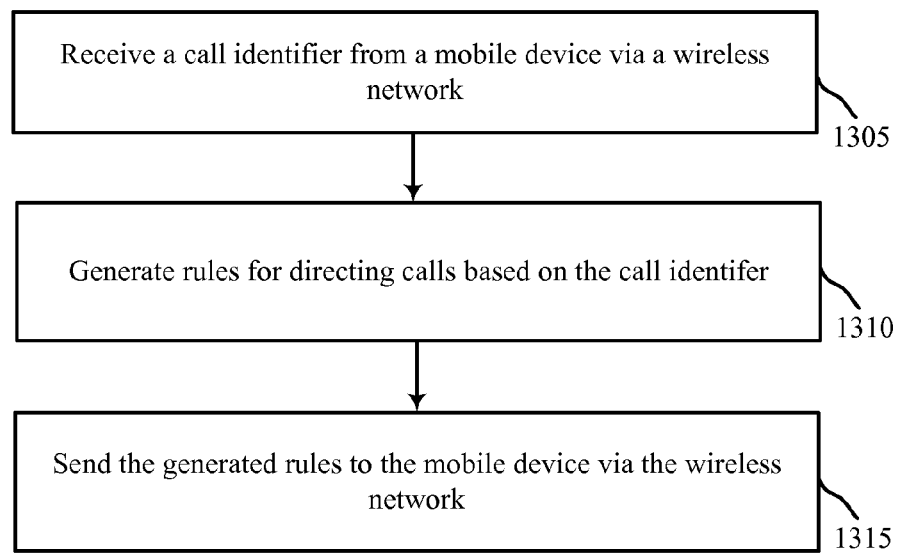

FIG. 13 includes a flow diagram that depicts an example method 1300 of LCD. The method 1300 may be implemented by an LCD server 130 described in the preceding figures. For example, various aspects of the method 1300 may be performed by one or more of the network communications module 730, the identifier database module 740, the telephone number database module 750, or the rule generation module 760 of FIG. 7A.

At block 1305, the method may include receiving a call identifier from a mobile device via a wireless network. The call identifier may be indicative of a first telephone number.

At block 1310, the method may include generating rules for directing calls based on the call identifier. The rules may include directions applicable to the mobile device based on a location of the mobile device. In some examples, the rules include direction applicable to the mobile device based on a service provider of the wireless network or a capability of the mobile device for initiating a call type. In some cases, the rules include directions for the mobile device to place a call utilizing a second telephone number that is different from the first telephone number indicated by the call identifier. Then, at block 1315, the method may include sending the generated rules to the mobile device via the wireless network.

Figure 14:
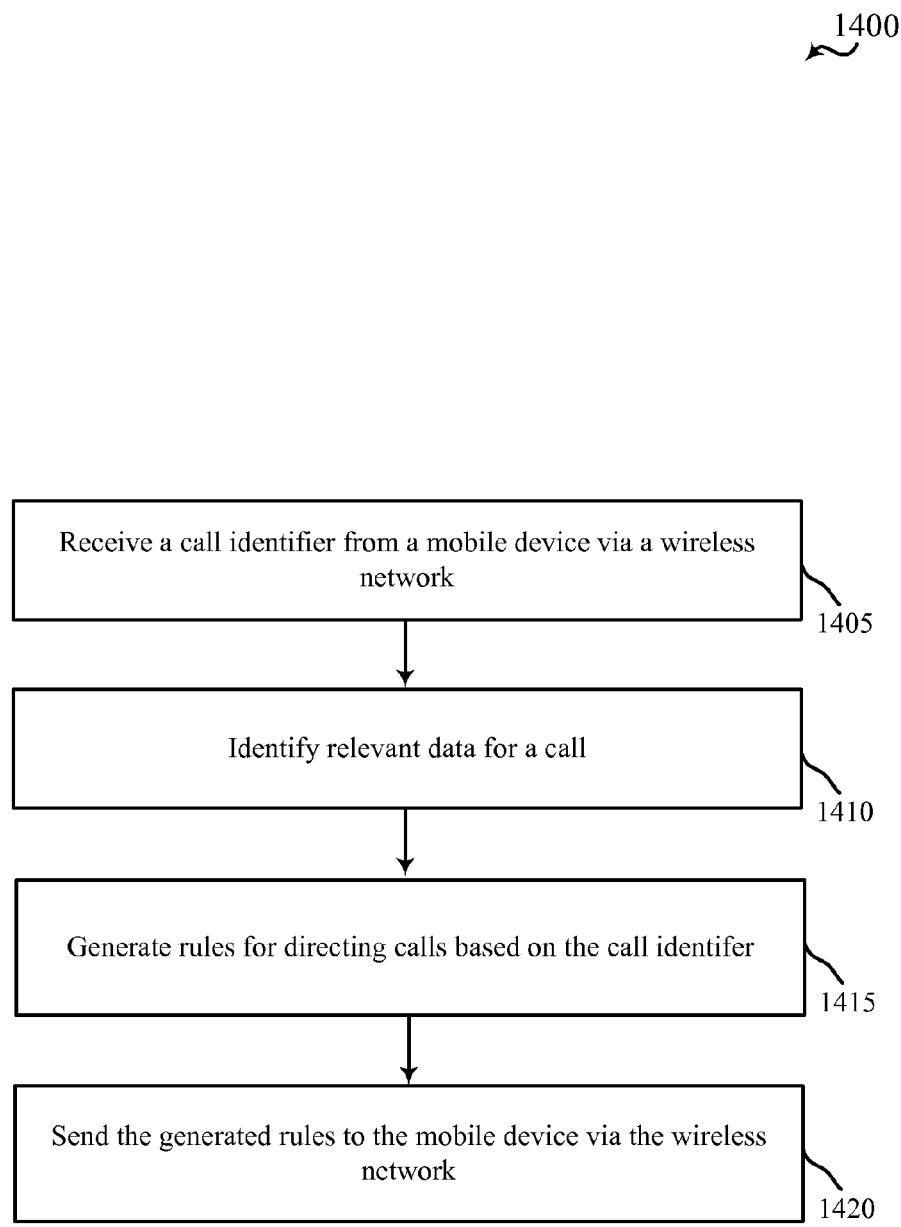

FIG. 14 includes a flow diagram that depicts an example method 1400 of LCD. The method 1400 may be implemented by an LCD server 130 described in the preceding figures. For example, various aspects of the method 1400 may be performed by one or more of the network communications module 730, the identifier database module 740, the telephone number database module 750, or the rule generation module 760 of FIG. 7A.

At block 1405, the method may include receiving a call identifier from a mobile device via a wireless network. At block 1410, the method may include identifying relevant data for a call. The relevant data may include the location of the mobile device, a location of a callee associated with the call identifier, network availability associated with mobile device (e.g., whether a particular network is available for a call), available technology for a call from the mobile device, or the like.

At block 1415, the method may include generating rules for directing calls based on the call identifier and the identified relevant data. Then, at block 1420, the method may include sending the generated rules to the mobile device via the wireless network.

Those skilled in the art will recognize that the methods discussed above are just example implementations of the tools and techniques described herein. The operations of the methods may be rearranged or otherwise modified such that other implementations are possible.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory, computer-readable medium. Other examples and implementations are within the scope and spirit of the disclosure and appended claims. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The foregoing provides examples, and is not intended to limit the scope, applicability or configuration of the disclosure. Instead, the above description will enable those skilled in the art to implement various embodiments. The skilled artisan will also recognize that changes may be made in the function and arrangement of the described elements.

What is claimed is:

1. A method of wireless communication by a mobile device, comprising:
   identifying a significant change event for the mobile device, wherein the significant change event comprises at least one of entering or leaving a cellular network, performing a cellular mobility operation, receiving a software update, or powering on or off, or any combination thereof;
   identifying a call identifier indicative of a first telephone number based at least in part on the significant change event;
   sending the call identifier from the mobile device to a server via a wireless network comprising a wireless local area network (WLAN) or a licensed spectrum cellular network;
   receiving at the mobile device from the server one or more rules for directing calls, the one or more rules based at least in part on the call identifier and comprising directions for the mobile device to place the call using a second telephone number different from the first telephone number and selected according to a location of the mobile device;
   determining a service provider associated with the wireless network;
   identifying the location of the mobile device;
   applying one or more of the received rules at the mobile device based at least in part on the identified location and the determined service provider; and
   placing a call with the mobile device using the second telephone number based at least in part on the applied rules and utilizing the WLAN or the licensed spectrum cellular network.

2. The method of claim 1, further comprising:
   determining a capability of the mobile device for initiating a call type, wherein applying the one or more received rules at the mobile device is based at least in part on the determined capability.

3. The method of claim 2, wherein the call type comprises at least one of a voice call, a video call, a video telephony call, or any combination thereof.

4. The method of claim 1, wherein the call identifier comprises at least one of a telephone number or a user identification number, or a combination thereof.

5. The method of claim 1, wherein the location comprises a geographic location.

6. A mobile device for wireless communication, comprising:
   a processor;
   memory in electronic communication with the processor; and
   instructions stored in the memory and operable, when executed by the processor, to cause the mobile device to:
      identify a significant change event for the mobile device, wherein the significant change event comprises at least one of entering or leaving a cellular network, performing a cellular mobility operation, receiving a software update, or powering on or off, or any combination thereof;
      identify a call identifier indicative of a first telephone number based at least in part on the significant change event;
      send the call identifier from the mobile device to a server via a wireless network comprising a wireless local area network (WLAN) or a licensed spectrum cellular network;
      receive at the mobile device from the server one or more rules for directing calls, the one or more rules based at least in part on the call identifier and comprising directions for the mobile device to place the call using a second telephone number different from the first telephone number and selected according to a location of the mobile device;
      determine a service provider associated with the wireless network;
      identify the location of the mobile device;
      apply one or more of the received rules at the mobile device based at least in part on the location and the service provider; and
      place a call with the mobile device using the second telephone number based at least in part on the applied rules and utilizing the WLAN or the licensed spectrum cellular network.

7. The mobile device of claim 6, wherein the instructions are operable to cause the mobile device to:
   determine a capability of the mobile device for initiating a call type, wherein applying the one or more received rules at the mobile device is based at least in part on the determined capability.

* * * * *